United States Patent [19]

Suda et al.

[11] Patent Number: 6,023,669

[45] Date of Patent: Feb. 8, 2000

[54] SYSTEM FOR GENERATING NATURAL LANGUAGE INFORMATION FROM INFORMATION EXPRESSED BY CONCEPT AND METHOD THEREFOR

[75] Inventors: Aruna Rohra Suda; Suresh Jeyachandran, both of Yokohama, Japan

[73] Assignee: Canon Kabushiki Kaisha, Tokyo, Japan

[21] Appl. No.: 08/580,311

[22] Filed: Dec. 28, 1995

[30] Foreign Application Priority Data

Dec. 28, 1994 [JP] Japan .................................. 6-327448
Dec. 28, 1994 [JP] Japan .................................. 6-327449

[51] Int. Cl.[7] .................................................. G06F 17/20
[52] U.S. Cl. ............................................................ 704/2
[58] Field of Search .............................. 395/751, 752, 395/753, 754, 755, 756, 757, 758, 759, 760, 1, 10, 12, 50, 902; 704/2, 4, 8, 9; 707/536; 706/45, 47

[56] References Cited

U.S. PATENT DOCUMENTS

| | | | |
|---|---|---|---|
| 4,829,423 | 5/1989 | Tennant et al. | 704/8 |
| 4,914,590 | 4/1990 | Loatman et al. | 704/8 |
| 5,083,268 | 1/1992 | Hemphill et al. | 395/12 |
| 5,280,573 | 1/1994 | Kuga et al. | 395/145 |
| 5,282,265 | 1/1994 | Suda et al . | 395/12 |
| 5,299,124 | 3/1994 | Fukumochi et al. | 704/2 |
| 5,329,446 | 7/1994 | Kugimiya et al. | 704/4 |
| 5,377,103 | 12/1994 | Lamberti et al. | 395/760 |
| 5,384,702 | 1/1995 | Tou | 395/760 |
| 5,510,981 | 4/1996 | Berger et al. | 704/2 |
| 5,826,220 | 10/1998 | Takeda et al. | 704/2 |
| 5,845,143 | 12/1998 | Yamauchi et al. | 704/4 |
| 5,930,746 | 7/1999 | Ting | 704/9 |

FOREIGN PATENT DOCUMENTS 0 361 366 A2  4/1990  European Pat. Off. .

*Primary Examiner*—Edward R. Cosimano
*Attorney, Agent, or Firm*—Fitzpatrick, Cella, Harper & Scinto

[57] ABSTRACT

When information expressed by concept is input to a natural language processing system, the form of expressing the input concept is selected by referring to a knowledge base having the knowledge of languages, general knowledge, and the knowledge of specific areas. In addition, the information expressed by the concept is split into individual concepts, one natural language expression is selected from among one or more natural language expressions with respect to the split individual concepts, and the selected natural language expression is output. In this way, information for natural language appropriate for the situation is generated from the same concept.

46 Claims, 53 Drawing Sheets

FIG. 3

ACTION / Results of Driving Forces

| SLOTNAME | |
|---|---|
| Actor | ⟨Person / Animate who is the agent⟩ |
| Object | ⟨which is the object of Action⟩ |
| Instrument | ⟨which is instrumental to Action / includindg procedures⟩ |
| Iobject -Beneficiary | ⟨Person who benefits⟩ |
| -Reason | ⟨which is an Action⟩ |
| -Direction | ⟨which can be Place or Person⟩ |
| -Via | ⟨which can be Place or Person⟩ |
| From | ⟨which can be Place or Person⟩ |
| Support | ⟨which can be Place or Organization⟩ |
| Time | ⟨which is Time⟩ |
| Connected To | |
| Tense / Modal | |
| Qualifier | |
| o o o | o o o |

FIG. 5

MEET

| SLOTNAME | |
|---|---|
| Actor | ⟨Person / Animate who is the agent⟩ |
| Object | ⟨Person who is the object⟩ |
| Instrument | |
| Iobject - Beneficiary | ⟨Person who benefits⟩ |
| - Reason | ⟨which is an Action⟩ |
| - Direction | nil |
| - Via | nil |
| From | |
| Support | |
| Time | ⟨which can be Place or Organization⟩ |
| Connected To | ⟨which is Time⟩ |
| Tense / Modal | o o o |
| Qualifier | |
| o o o | |

FIG. 6

MTRANS

| SLOTNAME | |
|---|---|
| Actor | <Person / Animate who is the agent> |
| Object | <which can be Action or Object> |
| Instrument | <which is instrumental to Action / includindg procedures> |
| Iobject -Beneficiary | <Person who benefits> |
| -Reason | <which is an Action> |
| -Direction | <which can be Place or Person> |
| -Via | <which can be Place or Person> |
| From | <which can be Place or Person> |
| Support | <which can be Place or Organization> |
| Time | <which is Time> |
| Connected To | |
| Tense / Modal | |
| Qualifier | |
| o o o | o o o |

FIG. 8

AGREEMENT

| SLOTNAME | |
|---|---|
| Actor | ⟨Person / Animate who is the agent⟩ |
| Object | ⟨which can be Accommodation / Ticket...⟩ |
| Instrument | ⟨which is instrumental to Action / Communication⟩ |
| Iobject -Beneficiary | ⟨Person who benefits⟩ |
| -Reason | ⟨which is an Action⟩ |
| -Direction | |
| -Via | |
| From | ⟨which can be Person⟩ |
| Support | |
| Time | ⟨which is Time⟩ |
| Connected To | |
| Tense / Modal | |
| Qualifier | |
| o o o | o o o |

FIG. 10A

| Word | Word-tag | Form (other properties) |
|---|---|---|
| come | come1 | BASEFORM |
| comes | come1 | PRESTFORM |
| coming | come1 | PROGFORM |
| came | come1 | PASTFORM |
| go | go1 | BASEFORM |
| goes | go1 | PRESTFORM |
| going | go1 | PROGFORM |
| went | go1 | PASTFORM |
| gone | go1 | PARTFORM |
| book | book2 | BASEFORM |
| books | book2 | PRESTFORM |
| booking | book2 | PROGFORM |
| booked | book2 | PASTFORM |
| sent | send1 | BASEFORM |
| send | send1 | PASTFORM |
| get | get1 | BASEFORM |
| got | get1 | PASTFORM |
| get | get2 | BASEFORM |
| got | get2 | PASTFORM |
| get | get3 | BASEFORM |
| got | get3 | PASTFORM |
| reserve | reserve1 | BASEFORM |
| reserved | reserve2 | PASTFORM |
| work | work1 | BASEFORM |
| accept | accept1 | BASEFORM |
| agree | agree1 | BASEFORM |
| decline | decline1 | BASEFORM |
| discuss | discuss1 | BASEFORM |
| inform | inform1 | BASEFORM |
| travel | travel1 | BASEFORM |
| travelling | travel1 | PROGFORM-British |
| traveling | travel1 | PROGFORM-US |
| analyse | analyse1 | BASEFORM-British |
| analyze | analyse1 | BASEFORM-US |
| meet | meet1 | BASEFORM |
| visit | visit1 | BASEFORM |
| visit | visit2 | BASEFORM |
| ... | ... | ... |

FIG. 10

| | | |
|---|---|---|
| FIG. 10A | | |
| FIG. 10B | | |

FIG. 10B

| | | |
|---|---|---|
| book | book1 | SINGULAR |
| books | book1 | PLURAL |
| pen | pen1 | SINGULAR |
| pens | pen1 | PLURAL |
| pencil | pencil1 | SINGULAR |
| bencils | pencil1 | PLURAL |
| letter | letter1 | SINGULAR |
| letters | letter1 | PLURAL |
| ... | ... | ... |
| some | some1 | |
| every | every1 | |
| ... | ... | ... |
| i | i1 | SUBJECTIVE |
| me | i1 | OBJECTIVE |
| my | i1 | POSS_REL |
| mine | i1 | POSS_OBJ_REL |
| you | you1 | OBJECTIVE, SECOND PERSON |
| ... | ... | |

FIG. 11

| word-tag | Concept & Conditions |
|---|---|
| come1 | PTRANS (Object-Nil, Iobj_direc-Vicinity of Listener's location, Instrument-Vehicle) [or]<br>PTRANS (Object-Nil, Iobj_direc-Vicinity of Listener's location, Instrument-Vehicle) |
| go1 | PTRANS (Object-Nil, Iobj_direc-Place, From-Place, Instrument-Vehicle) |
| send1 | PTRANS (Object-Movable, Iobj_benf-Person, Iobj_via-Person, Instrument ! = Actor, Iobj_direc Event or Building, Instrument-Vehicle or Person or Action) |
| get1 | PTRANS (Object-MovablePhysicalObject, Iobj_benf-Actor, Instrument-Post, from ! = Actor) |
| get2 | PTRANS (Object-MovablePhysicalObject, Iobj_benf-Actor, Instrument-Post, from ! = Actor) |
| get3 | ATRANS (Object-MovablePhysicalObject, Iobj_benf-Actor, Instrument-Post, from ! = Actor) |
| book2 | MTRANS (Object-MtransNoun or MbuildNounform or Mfeel or Action, Iobj_benf-Actor, Instrument-communication, from ! = Actor) |
| reserve1 | AGREEMENT (Object-Ticket or Building or Accommodation, Instrument-Action or communication) |
| accept1 | AGREEMENT (Object-Ticket or Building or Accommodation, Instrument-Action or communication) |
| agree1 | AGREEMENT (Object-Action or Offer, Mode+ve···) |
| decline1 | AGREEMENT (Object-Action, rel-agreement) |
| inform1 | AGREEMENT (Object-Action or Offer, Mode-ve···) |
| discuss1 | MTRANS (Object-MtransNoun or MbuildNounform or MbuildNounform or Mfeel or Action, Iobj_benf-Person,Instrument-communication, from-Person) |
|  | MTRANS (Object-MtransNoun or MbuildNounform or MbuildNounform or Mactobj or Action or SubMact, Iobj_benf-Person, Iobj_val-Nil, Instrument-communication, from-Nil, support-Building or Organization or Event) |
| work1 | WORK (Object-Work_domain or Project,···) |
| attend1 | MSENSE (Object-Event,···) |
| meet1 | MEET (Object-Person, Iobj_benf-Person,···) |
| visit1 | MEET (Object-Person,···) |
| visit2 | MSENSE (Object-Building,···) |
| accommodate1 | PCONFIG (Obj-Person, Actor-Physical Object, Support-Living Building) |
| book1 | PUBLIC-DOCUMENT (Published-Yes, Periodicity = nil···) |
| newspaper1 | PUBLIC-DOCUMENT (Published-Yes, Periodicity = Daily,···) |
| pen1 | WRITING-TOOL (Contains-Ink,···) |
| pencil1 | WRITING-TOOL (Contains-Graphite,···) |
| letter1 | PRIVATE-DOCUMENT (From-Person/Organization, Addressed to-Person/Organization, Written on-paper,···) |
| ··· | ··· |

FIG. 12

| Wordtag | category | | Position Information | Rules | Nounform |
|---|---|---|---|---|---|
| come1 | verb | | wform, *Iobj_direc, *From, *Iobj_reason, *Instrument, *Time | | |
| go1 | verb | | wform, *Iobj_direc, *From, *Iobj_reason, *Instrument, *Time | | |
| send1 | verb | | wform, Object, *Iobj_benf, *from, *Iobj_via, *Instrument, *Iobj_reason | | |
| | | | wform, Iobj_benf, Object, *Iobj_via, *from, *Instrument, *Iobj_reason | | |
| get1 | verb | | wform, Object, *From, *Instrument, *Time | focus (Object) | |
| get2 | verb | | wform, Object, *From, *Instrument, *Time | focus (Iobj) | |
| get3 | verb | | wform, Object, *From, *Instrument, *Time | | |
| book2 | verb | | wform, Object, *From, *Instrument, *Time | | |
| reserve1 | verb | | wform, Object, *Iobj_benf, *Iobj_reason, *Time | | |
| accept1 | verb | | wform, Object, *Iobj_benf, *Iobj_reason, *Time | | |
| agree1 | verb | | ... | | |
| decline1 | verb | | ... | | |
| inform1 | verb | | wform, *Object, *Instrument, *support, *Iobj_reason, *Time | | |
| discuss1 | verb | | wform, Iobj_benf, *Object, *Instrument, *Support, *Time | | discussion |
| work1 | verb | | wform, *Object, *Instrument, *Support, *Time | | |
| meet1 | verb | | wform, *Object, *Support, *Iobj_reason, *Time | | |
| visit1 | verb | | wform, Object, *Iobj_reason, *Support, *Time | | |
| visit2 | verb | | wform, *Object, *Suppor, *Timet | | |
| accommodate1 | verb | | wform, *Object, *Support, *Time | | accommodation |
| book1 | noun | Countable, Neuter, Common_Noun | name, wform, *contains | | |
| | | | name, wform, *contains, *authors | authors = NIL | |
| pen1 | noun | Countable, Neuter, Common_Noun | | | |
| pencil1 | noun | Countable, Neuter, Common_Noun | | | |
| workdomain1 | noun | UnCountable, Neuter | | | |
| letter1 | noun | Countable, Neuter, Common_Noun | wform, Methodology, *Since | | |
| i1 | pronoun | First_Person, Singular, Common | | | |
| we1 | pronoun | First_Person, Plural, Common | | | |
| you1 | pronoun | Second_Person, Singular, Common | | | |
| he1 | pronoun | Third_Person, Singular, Masc | | | |
| she1 | pronoun | Third_Person, Singular, Fem | | | |
| it1 | pronoun | Third_Person, Singular, Neuter | | | |
| ... | | | | | |

FIG. 16

Beautify [you do x] to the form

If level of Speaker ≪ level of Litsener them
    if a request has been made already then
        - May I also request you to kindly arrange / reserve ···
    else
        - May I request you to kindly arrange / reserve ···

If level of Speaker < Level of Listener
        - I shall be extremely grateful if you would kindly ···

If Speaker is very much familiar with Listener then
if a request been made already them
        - Also, Kindly arrange for ···
        - Please / Kindly arrange for ···

If Speaker is familiar with Listener then
    if a request has been made already then
        - Could you kindly also arrange for ···
        - Could you kindly arrange for ···

If level of Speaker = level of Listener then
    If a request has been made already then
        - Would it also be possible for you to arrange ···
    else
        - Would it be possible for you to arrange ···

Beautify [do x] to the form

If level of Speaker ≪ level of Listener then
  if a request has been made already then
    - I shall also be extremely obliged if you could / would kindly [do x]
  else
    - I shall be very grateful / thankful if you could / would kindly [do x]
else
  - I shall be obliged / grateful / thankful if you could / would kindly [do x]
...

FIG. 18

Beautify [do x] to the form

If Speaker is very much familiar with Listener then
   if a request has been made already then
     - Could you also kindly do X
   else
     - Could you kindly do X If Speaker is familiar with Listener then
   if a request has been made already then
     - 'May I / Can I also request to kindly (do X)'
   else
     - 'I would like to request you to kindly / please (do X), if possible.

else
   - 'I shall very much appreciate if you would kindly (do X)
   (or) - It would be much appreciated if you would kindly (do X).

Beautify [do x] to the form

If Speaker is very much familiar with Listener then
  if a request has been made already then
    - 'Also, Kindly / Please [do x]'
  else
    - 'Kindly / Please [do x]'
Else
  if a request has been made already then
    - Could you also kindly do X
  else
    - Could you kindly do X
    ...

FIG. 20

INPUT : {Con1, Con2}

Con1 = PTRANS {
  Actor - P1 {name - Aruna Rohra}
  Object - nil
  Iobj - direction - C1 {COUNTRY name - USA}
  Iobj - reason - C2 {business}
  ...
  Time - T1 {in May}
  Support -....
  Tense - {Future}
  ...}

Con2 = WANT {
  Actor - P1 {name - Aruna Rohra}
  Object - Con21
  Instrument -....
  From -...
  Iobject -....
  Support -....
  Tense - {Future}
  ...}

Con21 = MEET {
  Actor - P1 {name - Aruna Rohra}
  Object - P2 {name - John Smith}
  ...
  Support -....
  Time - T2 {10th May 93}
  Tense - {Future}
  ...}

FIG. 21

```
OUTPUT : [Coord1]

Coord1 = COORD {
    con1 - Con1
    con2 - Con2
}

Con1 = PTRANS {
    Actor - P1 {name - Aruna Rohra}
    Object - nil
    Iobj - direction - C1 {COUNTRY name - USA}
    Iobj - reason - C2 {business}
    Time - T1 {in May}
    Support - ....
    Tense - {Future}
    CannedPhrase - {'It so happens' before Sentence}
    ...}

Con2 = ACONFIG {
    Actor - P1 {name - Aruna Rohra}
    Object - C2 {grateful}
    Instrument - ....
    From - ....
    Iobject - ....
    Support - ....
    Tense - {Future}
    Connectedto (Condn. Con21)
    ...}

Con21 = MEET {
    Actor - P1 {name - Aruna Rohra}
    Object - P2 {name - John Smith}
    ...
    Support - ....
    Time - T2 {10th May 93}
    Tense - {Future}
    ...}
```

FIG. 22

INPUT : {Con3}

Con3 = AGREEMENT {
 Actor - P2 {name - John Smith}
 Object - A1 {ACCOMMODATION (Support - Hotel (Name - Miyako Inn···)}
 Iobj - bent - P1 {name - Aruna Rohra)
 Iobj - reason - C3 {STAY (Actor - P1, Time - T1)}
 ...
 Support -....
 Tense - {Future, Imperative}
 ...}

FIG. 23

OUTPUT : {Con4}

Con4 = ACONFIG {
    Actor - P1 {name - Aruna Rohra}
    Object - C4 {grateful}
    ...
    Tense - {Future}
    Connectedto - {Condn, Con3}
    ...}

Con3 = AGREEMENT {
    Actor - P2 {name - John Smith}
    Object - A1 {ACCOMMODATION (Support - Hotel (Name - Miyako Inn..)}
    Iobj - bent - P1 {name - Aruna Rohra}
    Iobj reason - C3 {STAY (Actor - P1, Time - T1)}
    ...
    Support -....
    Tense - {Future, Imperative}
    ...}

FIG. 24

OUTPUT : {Con3}

Con3 = AGREEMENT {
   Actor - P2 {name - John Smith}
   Object - A1 {ACCOMMODATION (Support - Hotel (Name - Miyako Inn..))}
   Iobj - bent - P1 {name - Aruna Rohra}
   Iobj - reason - C3 {STAY (Actor - P1, Time - T1)}
   ...
   Support - ...
   Tense - {Future, Interrogative
   Modal - {POSSIBILITY}
   ...}

FIG. 25

INPUT : {Con5}

Con5 - PTRANS {
    Actor - P1 {name - Aruna Rohra}
    Object - nil
    Iobj - direc - V1 {P2 (name - John Smith)'s Place}
    Iobj - reason -....
    Instrument - Question
    ...
    Support -....
    Tense - {Question}
    ...}

FIG. 26

OUTPUT : {Con6}

Con6 = MTRANS {
  Actor - P2 (name - John Smith)'
  Object - Con5
  Iobj - benf - P1 {name - Aruna Rohra}
  ...
  Tense - {Future}
  Qualifier - {also}
  ...}

Con5 = PTRANS {
  Actor - P1 {name - Aruna Rohra}
  Object - nil
  Iobj - direc - V1 {P2 (name - John Smith)'s Place}
  Iobj - reason -.···
  Instrument - Question
  ...
  Support -.···
  Tense - {Question}
  ...}

FIG. 27 a) 'Due to the low pressure developing over the sea & due to the absence of any high pressure over the continent, which would have weakened the low pressure but since this is not the case there is a typhoon developing at 200km off the sea coast which would drastically change the weather over the next two days - resulting in cloudy weather through out the country, increasing the probability of rain, thunderstorm, gusty winds resulting in high waves at the sea which could be dangerous to people at the costal areas, fishermen···' b) 'There is typhoon developing at 200km off the seacoast which would bring rain thunderstorm, gusty winds and high waves at the sea. Caution is advised for people living in costal areas & fishermen···'

FIG. 28

'must' is used to show that the Speaker orders or expects something to be done.
It is also used to advise or recommend (informal 'got to') & while drawing a conclusion
about which there is a doubt.

e.g., You must get back by 2 pm.

'need to' & informally 'have to' is used when somebody else is giving orders or
controlling events.
e.g., you need to pass the entrance exam to enter the University 'ought to' & 'should' indicate that the speaker is giving an order, but suggest that
he / she is not sure it will be obeyed.
e.g., you ought to / should apologize 'shall' is used with I or we to predict a future event.
'will' is used with you, he, she, it, they as well as I & we (informal than shall).
Both 'shall' & 'will' can express determination (shall more formal)

'can', 'could', 'may' are used while giving / requesting permission
'British speakers normally use 'can',
'could' is more polite & used in question form,
'may' is formal but US Speakers often use 'may'

'can', 'could', 'may', 'might' are used to express a possibility
'could', 'might' express more doubt or hesitation than 'may'
'could have', 'may have', 'might have' are used to show the possibility of something
having happened in past··· o o o

FIG. 29

INPUT : {Con7}

Con7 = MTRANS {
  Actor - P1 (name - Aruna Rohra)'
  Object - (Plan)
  Iobj - benf - P2 {name - John Smith}
  ...
  Time - (>Today)
  Tense -
  Modal
  ...)

FIG. 30

OUTPUT : {Con7}

Con7 = MTRANS {
    Actor - P1 (name - Aruna Rohra)'
    Object - (Plan)
    Iobj - benf - P2 {name - John Smith}
    ...
    Time - (>Today)
    Tense - (FTURE)
    Modal - (INTENTION)
    ...}

FIG. 31 a) ···

I request you kindly arrange for my accommodation during my visit to Japan

Since I will be reaching on the Saturday, I was just wondering if I could utilize the next day to do some sightseeing of Tokyo. Could you kindly suggest some of the places I should see & how can I move around the city ? ···

Thanking you,

··· b) ···

I request you kindly arrange for my accommodation during my visit to Japan.

Since I will be reaching on the Saturday, I was just wondering if I could utilize the next day to do some sightseeing of Tokyo. Could you kindly suggest some of the places I should see & how can I move around the city ?
···

May I remind you once again to arrange for my booking,
···

FIG. 45

```
Con1 = WORK {
        Actor - P1
        Object - W1
        Instrument -···
        From -···
        Iobject -···
        Support -···
        Tense - {Present Progressive}
        ···}

P1 = PERSON {
        Name            N1 (Aruna Rohra)
        Age             ···
        Phone           N2 (+81-44-549-5454)
        Sex             Female
        Address         V1 (Yokohama, Nishi - Kn, Hiranuma 2-4-7)
        Organization    Org1 (···)
        Work            W1 (···)
        Designation     Senior Engineer
        ···}

W1 = WORK  DOMAIN {
        Name - Cognitive Science
        methodology - {PERSON (name - John Smith···), (theory of learning)}
        KnowledgeDomain -···
        Since - T1 {April, 1988}
        ···}
```

FIG. 46

```
LingCon1 = WORK {
        Actor - LingP1
        Object - LingW1
        Instrument -···
        From -···
        Iobject -···
        Support -···
        Tense - {Present Progressive}
        Reference Count - 1
        ···}

LingP1 = PERSON {
        Concept - P1
        Case - Subjective
        Number - 1
        Gender - Feminine
        Role - First Person
        Reference Count - 1
        Supress - No
        ···
        }

P1 = PERSON {
        Name          N1 (Aruna Rohra)
        Age           ···
        Phone         N2 (+81-44-549-5454)
        Sex           Female
        Address       V1 (Yokohama, Nishi - Ku, Hiranuma 2-4-7)
        Organization  Org1 (···)
        Work          W1 (···)
        Designation : Senior Engineer
        ···}

LingW1 = LINGUISTIC CONCEPT {
        Conecept - W1
        Case - Objective
        Number - 1
        Gender - Neuter
        Reference Count - 1
        Supress - No
        ···
        }

W1 = WORK _ DOMAIN {
        Name - Cognitive Science
        methodology - {PERSON (name - John Smith···), (theory of learning)}
        KnowledgeDomain -···
        Sinc - T1 {April, 1988}
        ···}
```

FIG. 47

```
Con2 = WANT {
        Actor - P1
        Object - Con3
        Instrument -···
        Frome -···
        Iobject -···
        Support -···
        Tense - {Future}
        ···}

Con3 = MTRANS {
        Actor - P1
        Object - W1
        IobjectBenf - P2
        Instrument -···
        From -···
        Iobject -···
        Support -···
        Tense - {Future}
        ···}

P1 = PERSON {
        Name            N1 (Aruna Rohra)
        Age             ···
        Phone           N2 (+81-44-549-5454)
        Sex             Female
        Address         V1(Yokohama, Nishi - Ku, Hirnuma 2-4-7)
        Organization    Org1 (···)
        Work            W1 (···)
        Designation : Senior Engineer
        ···}

W1 = WORK_DOMAIN {
        Name - Cognitive Science
        methodology - {PERSON (name - John Smith···), (theory of learning)}
        KnowledgeDomain -···
        Since - T1 {April, 1988}
        ···}

P2 = PERSON {
        Name            N3 (John Smith)
        Age             ···
        Phone           N4 (+1-212-772-8753
        Sec             Male
        Address         V2 (···)
        Organization Orge2  (···)
        Work            W2
        Designation     Professor
        ···}
```

FIG. 48

```
LingCon2 = WANT {
        Actor - LingP2
        Object - LingCon3
        Instrument -···
        From -···
        Iobject -···
        Support -···
        Tense - {Future}
        Reference Count - 1
        ···}
LingCon3 = MTRANS {
        Actor - LingP3
        Object - LingW2
        IobjectBenf - LingP4
        Instrument -···
        From -···
        Iobject -···
        Support -···
        Tense - {Future}
        Reference Count - 1
        ···}
LingP2 = PERSON {                    LingP3 = PERSON {
        Concept - P1                         Concept - P1
        Case - Subjective                    Case - Subjective
        Number - 1                           Number - 1
        Gender - Feminine                    Gender - Feminine
        Role - First Person                  Role - First Person
        Reference Count - 2                  Reference Count - 3
        Supress - No                         Supress - No
        ···                                  ···
        }                                    }
LingW2 = LINGUISTIC CONCEPT {
        Concept - W1
        Case - Objective
        Number - 1
        Gender - Neuter
        Reference Count - 2
        Supress - No
        ···
        }
LingP4 = PERSON {
        Concept - P2
        Case - Objective
        Number - 1
        Gender - Masculine
        Role - Second Person
        Reference Count - 1
        Supress - No
        ···
        }
```

FIG. 49

```
Con4 = WANT {
         Actor - P1 {name - Aruna Rohra}
         Object - Con5
         Instrument -···
         From -···
         Iobject -···
         Support -···
         Tense - {Future}
         Connectedto - {REASON, Con6}
         ···}

Con5 = MEET {
         Actor - P1 {name - Aruna Rohra}
         Object - P2 {name - John Smith}
         ···
         Support -···
         Tense - {Future}
         ···}

Con6 = PTRANS {
         Actor - P1 {name - Aruna Rohra}
         Object - nil
         Iobj - direction - C1 {COUNTRY name - USA}
         Iobj - reason - Con7
         ···
         Support -···
         Tense - {Future}
         ···}

Con7 = MSENSE {
         Actor - P1 {name - Aruna Rohra}
         Object - Conf1 {CONFERENCE name - | JCA | }
         Time -···
         Tense - {Future}
         ···}
```

FIG. 50

LingCon8 = REASON {
　　con1 - LingCon6
　　con2 - LingCon4
　　...}

LingCon4 = WANT {
　　Actor - LingP5 {name - Aruna Rohra}
　　Object - LingCon5
　　Instrument - ...
　　From - ...
　　Iobject - ...
　　Support - ...
　　Tense - {Future}
　　...}

LingCon6 = PTRANS {
　　Actor - LingP8 {name - Aruna Rohra}
　　Object - nil
　　Iobj - direction - LingC1 {COUNTRY name - USA}
　　Iobj - reason - LingCon7
　　...
　　Support - ...
　　Tense - {Future}
　　...}

LingCon7 = MSENSE {
　　Actor - LingP9 {name - Aruna Rohra}
　　Object - LingConf1 {CONFERENCE name - | JCA | }
　　Time - ...
　　Tense - {Future}
　　...}

LingCon5 = MEET {
　　ActorLingP6 {name - Aruna Rohra}
　　Object - LingP7 {name - John Smith}
　　...
　　Support - ...
　　Tense - {Future}
　　...}

FIG. 51

```
Coord1 = COORD {
        con1 - Con9
        con2 - Con10
        ...}

Con9 = PTRANS {
        Actor - P1 {name - Aruna Rohra}
        Object - nil
        Iobj - direction - C1 {COUNTRY name - USA}
        Iobj - reason - C2 {business}
        ...
        Support -...
        Tense - {Future}
        CannedPhrase - {'It so happens' before Sentence}
        ...}

Con10 = ACONFIG {
        Actor - P1 {name - Aruna Rohra}
        Object - {grateful}
        instrument -...
        From -...
        Iobject -...
        Support -...
        Tense - {Future}
        Connectedto - {CONDN, Con11}
        ...}

Con11 = MEET {
        Actor - P1 {name - Aruna Rohra}
        Object - P2 {name - John Smith}
        ...
        Support -...
        Tense - {Future}
        ...}
```

FIG. 52

```
Coord1 = COORD {
        con1 - LingCon9
        con2 - LingCon10
        ...}

LingCon9 = PTRANS {
        Actor - LingP10 {name - Aruna Rohra}
        Object - nil
        Iobj - direction - LingC2 {COUNTRY name - USA}
        Iobj - reason - LingC22 {business}
        ...
        Support -...
        Tense - {Future}
        CannedPhrase - {'It so happens' before Sentence}
        ...}

LingCon10 = CONDN {
        con1 - LingCon11
        con2 - LingCon12
        ...}

LingCon11 = ACONFIG {
        Actor - LingP11 {name - Aruna Rohra}
        Object - {grateful}
        instrument -...
        From -...
        Iobject -...
        Support -...
        Tense - {Future}
        ...}

LingCon12 = MEET {
        Actor - LingP12 {name - Aruna Rohra}
        Object - LingP13 {name - John Smith}
        ...
        Support -...
        Tense - {Future}
        ...}
```

SYSTEM FOR GENERATING NATURAL LANGUAGE INFORMATION FROM INFORMATION EXPRESSED BY CONCEPT AND METHOD THEREFOR

BACKGROUND OF THE INVENTION

1. Field of the Invention

The present invention relates to a system for inputting conceptual information, and generating and outputting natural language information, and a method therefor.

2. Description of the Related Art

Hitherto, there is a system for generating a sentence of natural language information by using character strings of a fixed form, templates of a fixed form or the like. Also, there is a system for generating a sentence from the system's internal expression, such as a conceptual expression or a syntax tree.

In another example, a system has been developed by Kathleen R. McKeown, which generates text by using a limitation of focus of a topic and discourse analysis with correlation as a reference.

However, in a system for generating a sentence from a fixed template, it is not always possible to generate a sentence suited to the style of a particular person. Therefore, the same sentence is always output with respect to the same input, and a style desired by the user cannot be obtained. The expression form of a sentence depends upon various factors, including the features of each language, and, to create a high-quality document, sentences must be changed or added.

SUMMARY OF THE INVENTION

Accordingly, it is an object of the present invention to provide a natural language processing system capable of generating a sentence suitable for individual situations and a method therefor.

It is another object of the present invention to provide a natural language processing system capable of generating a sentence appropriate for the style of a person and a method therefor.

According to one aspect, the present invention which achieves these objectives relates to a natural language processing system, comprising: input means for inputting information expressed by a concept; a knowledge base having the knowledge of languages, general knowledge, and the knowledge of specific areas; selecting means for selecting the expression form of a concept which is input from the input means by referring to the knowledge base; and output means for outputting the expression form selected by the selecting means.

According to another aspect, the present invention which achieves these objectives relates to a natural language processing system, comprising: input means for inputting information expressed by a concept; a knowledge base having the knowledge of languages, general knowledge, and the knowledge of specific areas; determination means for determining information to be added to input information from the input means by referring to the knowledge base; and output means for adding the information determined by the determination means to the input information and outputting the information.

According to a further aspect, the present invention which achieves these objectives relates to a natural language processing system, comprising: input means for inputting information expressed by a concept; a knowledge base having the knowledge of languages, general knowledge, and the knowledge of specific areas; connecting means for connecting a plurality of concepts from the input means by referring to the knowledge base; and output means for outputting the concept connected by the connecting means as one concept.

According to a still further aspect, the present invention which achieves these objectives relates to a natural language processing system, comprising: input means for inputting information expressed by a concept; splitting means for splitting the input information from the input means into individual concepts by referring to the knowledge base; selecting means for selecting one natural language expression from one or more natural language expressions with respect to individual concepts split by the splitting means by referring to the knowledge base; and output means for outputting a natural language expression selected by the selecting means.

According to another aspect, the present invention which achieves these objectives relates to a natural language processing method, comprising: input step of inputting information expressed by a concept; selecting step of storing the form of expressing the concept input from the inputting step by referring to a knowledge base having the knowledge of languages, general knowledge, and the knowledge of specific areas; and output step of outputting the expression form selected in the selecting step. The selecting means can include parameter determination means for determining a parameter which is dependent upon a language. The parameter determining means includes number determination means for determining the number of nouns and the number determination means includes counting means for counting the number of times the same noun is used.

According to a further aspect, the present invention which achieves these objectives relates to a natural language processing method, comprising: input step of inputting information expressed by a concept; determining step of determining information to be added to the input information from the input step by referring to a knowledge base having the knowledge of languages, general knowledge, and the knowledge of specific areas; and output step of adding the information determined in the determining step and outputting the information.

According to a further aspect, the present invention which achieves these objectives relates to a natural language processing method, comprising: input step of inputting information expressed by a concept; connecting step of connecting a plurality of concepts from the input means by referring to a knowledge base having the knowledge of languages, general knowledge, and the knowledge of specific areas; and output step of outputting the concept connected in the connecting step as one concept.

According to a still further aspect, the present invention which achieves these objectives relates to a natural language processing method, comprising: input step of inputting information expressed by a concept; splitting step of splitting input information input in the input step into individual concepts by referring to a knowledge base having the knowledge of languages, general knowledge, and the knowledge of specific areas; and selecting step of selecting one natural language expression from one or more natural language expressions with respect to individual concepts split in the splitting step; output step of outputting the natural language expression selected in the selecting step.

Other objectives and advantages besides those discussed above shall be apparent to those skilled in the art from the description of a preferred embodiment of the invention which follows. In the description, reference is made to the accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 3 shows the structure of concepts of an action;

FIG. 5 shows the structure of the concept of MEET;

FIG. 6 shows the structure of the concept of MTRANS;

FIG. 8 shows the structure of the concept of AGREEMENT;

FIG. 10 shows the relationship between FIGS. 10A and 10B, and FIGS. 10A and 10B show an example of a form dictionary.

FIG. 11 shows an example of a dictionary of concepts;

FIG. 12 shows an example of grammar;

FIG. 16 shows an example of rules for a case of an arrange request;

FIG. 17 shows an example of rules for a case of a request to a person in an upper rank;

FIG. 18 shows an example of rules for a case of a request to a person in the same rank;

FIG. 19 shows an example of rules for a case of a request to a person in a lower rank;

FIG. 20 shows an example of an input to a pregenerator;

FIG. 21 shows an example of an output from a pregenerator;

FIG. 22 shows an example of an input to a pregenerator;

FIG. 23 shows an example of an output from the pregenerator;

FIG. 24 shows an example of an output from the pregenerator;

FIG. 25 shows an example of an input to the pregenerator;

FIG. 26 shows an example of an output from the pregenerator;

FIG. 27 shows an example of an input/output from the pregenerator;

FIG. 28 shows an example of rules for determining the mood;

FIG. 29 shows an example of an input to the pregenerator;

FIG. 30 shows an example of an output from the pregenerator;

FIG. 31 shows an example of an input/output from the pregenerator;

FIG. 45 shows an input example;

FIG. 46 shows the structure of an action;

FIG. 47 shows an input example;

FIG. 48 shows the structure of an action;

FIG. 49 shows an input example;

FIG. 50 shows a linguistic structure;

FIG. 51 shows an input example; and

FIG. 52 shows a linguistic structure.

FIG. 53 shows a schematic block diagram of the selecting means.

DESCRIPTION OF THE PREFERRED EMBODIMENT

One preferred embodiment of the present invention will be described below in detail with reference to the accompanying drawings.

Figure 1:
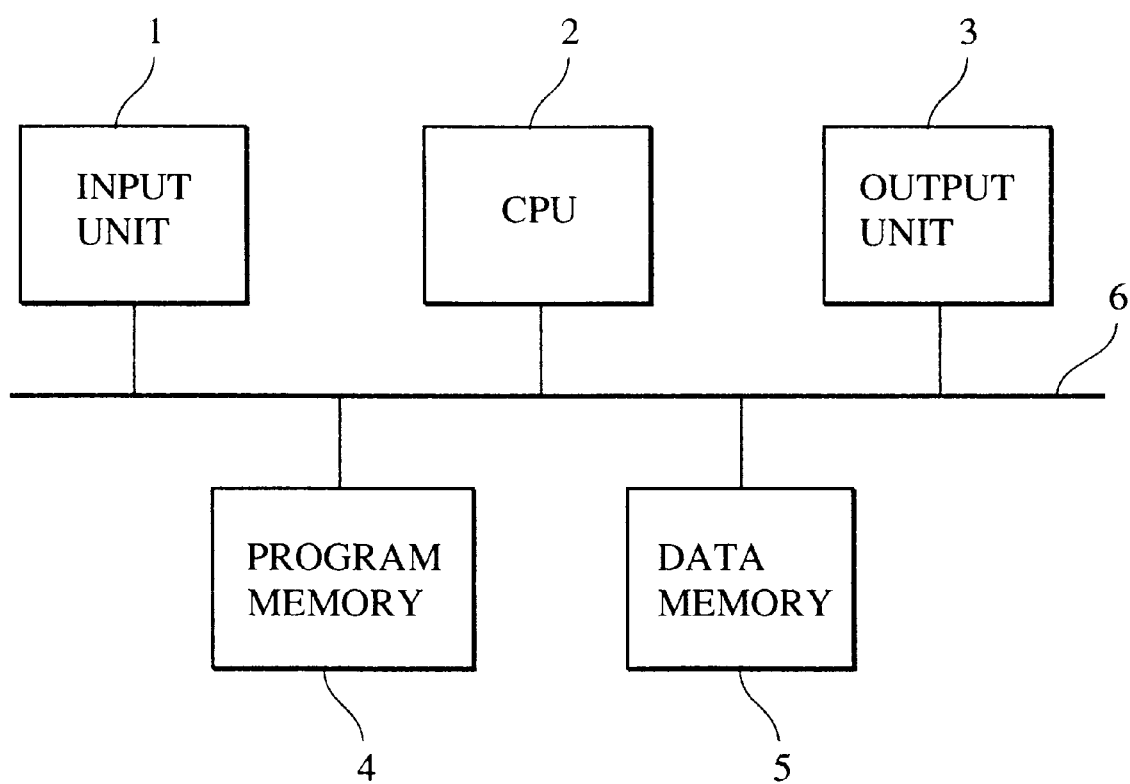
FIG. 1 is a block diagram illustrating the hardware configuration of a natural language processing apparatus in accordance with an embodiment of the present invention.

FIG. 1 is a block diagram illustrating the hardware configuration of an embodiment of a natural language processing apparatus in accordance the present invention.

Referring to FIG. 1, an input unit 1 inputs information in the form of natural language information. Hereinafter, input information is referred to as a sentence. In this apparatus, a sentence, if it has a fixed ordered structure, can be made to be a processing object even if the sentence is not a grammatically complete sentence.

The input unit 1 is a unit for inputting information. Examples of the input unit 1 are voice recognition apparatus for inputting and recognizing voice, a keyboard for inputting characters, a character recognition apparatus for optically reading characters from a document and recognizing them, an online/offline handwriting character recognition apparatus, and a receiving apparatus for receiving information from another system, for example, an apparatus for receiving a recognition result from a character recognition apparatus. Information generated from another process in the same apparatus may be an input in this case. In addition, two or more of these apparatuses may be provided and used selectively.

A CPU 2 performs operations, logical decisions, etc., for various processes, and controls each of the components connected to a bus 6.

An output unit 3 is a unit for outputting information. Examples of the output unit 3 are a speech synthesis apparatus for synthesizing a speech from character information and outputting it, a display apparatus, such as a CRT or a liquid-crystal display unit, a printer for printing out characters on a document, and a transmitting apparatus for transmitting information to another apparatus, such as a database. An output in this case may be an input to another process in the same apparatus, for example, a concept analyzer. In addition, two or more of these apparatuses may be provided and used selectively.

A program memory 4 is a memory for storing programs for control effected by the CPU 2, including procedural steps to be described later in accordance with a flowchart. The program memory 4 may be a ROM or RAM in which programs are loaded from an external storage apparatus.

A data memory 5 stores the contents of a knowledge base to be described later. The data memory 5 is made of, for example, RAM. It is assumed that the knowledge of the knowledge base is loaded from a non-volatile external storage medium prior to processing, or a reference is made thereto each time it becomes necessary.

The bus 6 transfers an address signal indicating a component to be controlled by the input unit 1, a control signal for controlling each component, and data exchanged between the component apparatuses.

Figure 2:
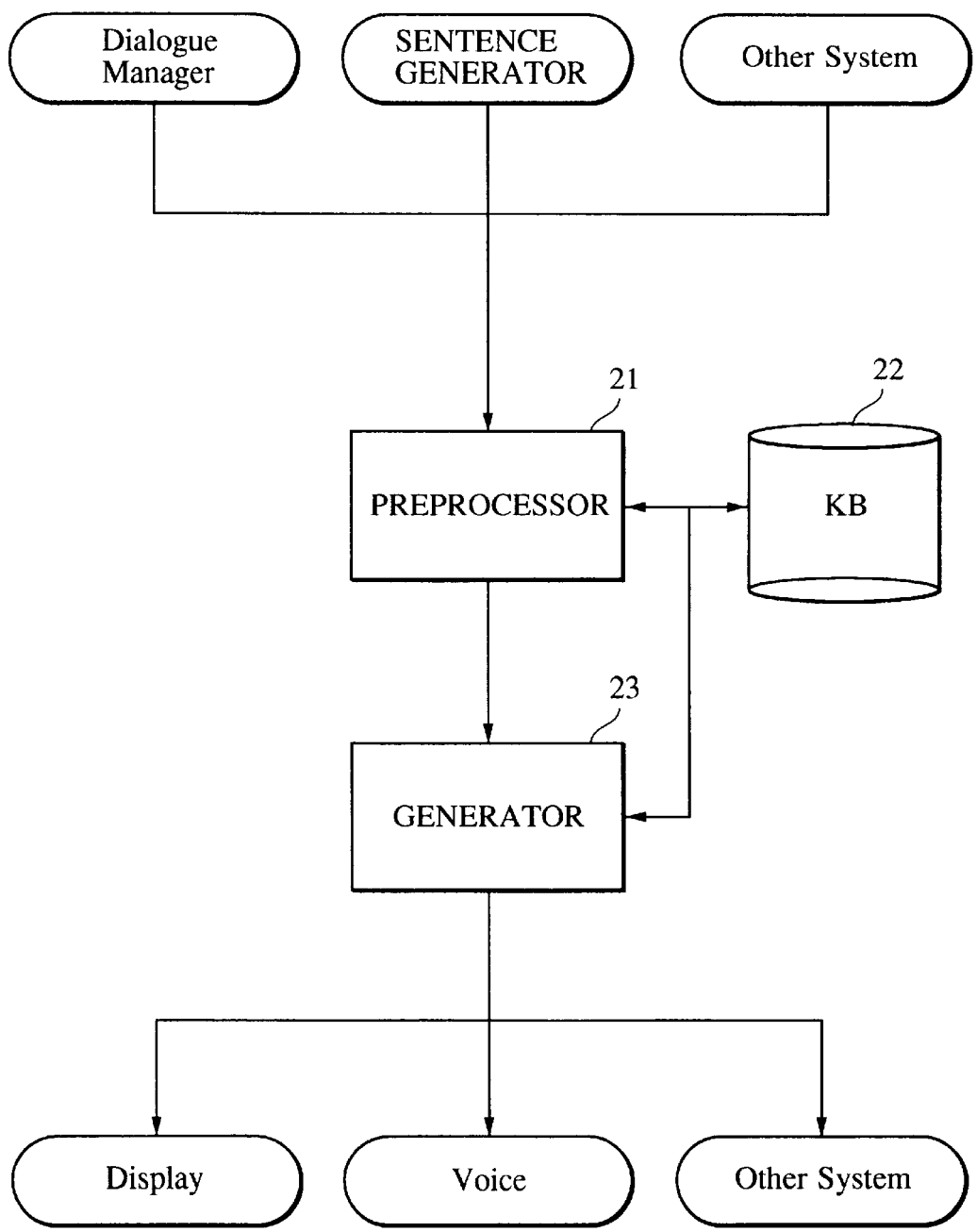
FIG. 2 is a block diagram illustrating the functional structure of a natural language processing system.

FIG. 2 is a block diagram illustrating the functional structure of a natural language processing system. Here, "preparation" refers to that the internal expression of a computer, such as conceptual expression, is converted into the expression of natural language, such as English. However, in the system of this embodiment, in addition to this preparation, a combination of such internal expression and a template can also be processed. Referring to FIG. 2, a pregenerator 21 adds or changes the internal expression of the concept or the like input from a text preparator in order to prepare an well-organized output sentence in accordance with the style of a person or difference in the rank relation between the speaker and the reader, and outputs it to a generator 23. A knowledge base 22 has prepared therein knowledge necessary for that addition or change. The generator 23 converts a sentence such that factors, such as the style of a person or the rank relation between the speaker and the listener, are included by the pregenerator 21, and generates a well-organized, high-quality sentence.

The pregenerator 21 is able to perform processes, such as combining short sentences into a complex sentence, or splitting a complex sentence, in order to improve readability. The pregenerator 21 is also able to use long/short expressions according to the user's taste, and determines the expression form, such as a suggestive or imperative form, and the relationship between the speaker and the listener. As described above, the pregenerator 21 transforms the internal expression and outputs it, and the generator 23 generates a sentence from the internal expression of the transformed word.

Figure 4:
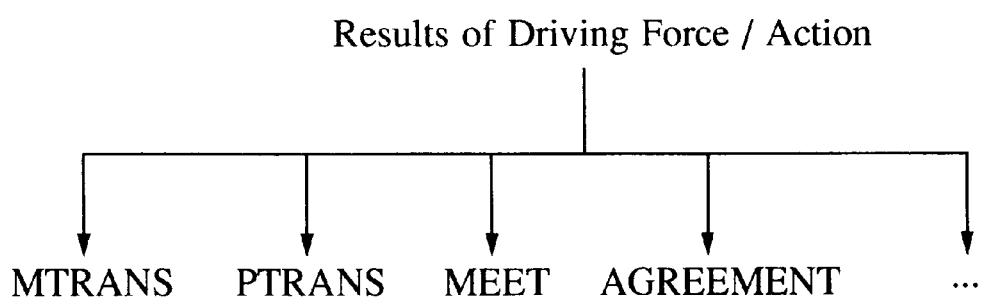
FIG. 4 shows an example of an action.
Figure 7:
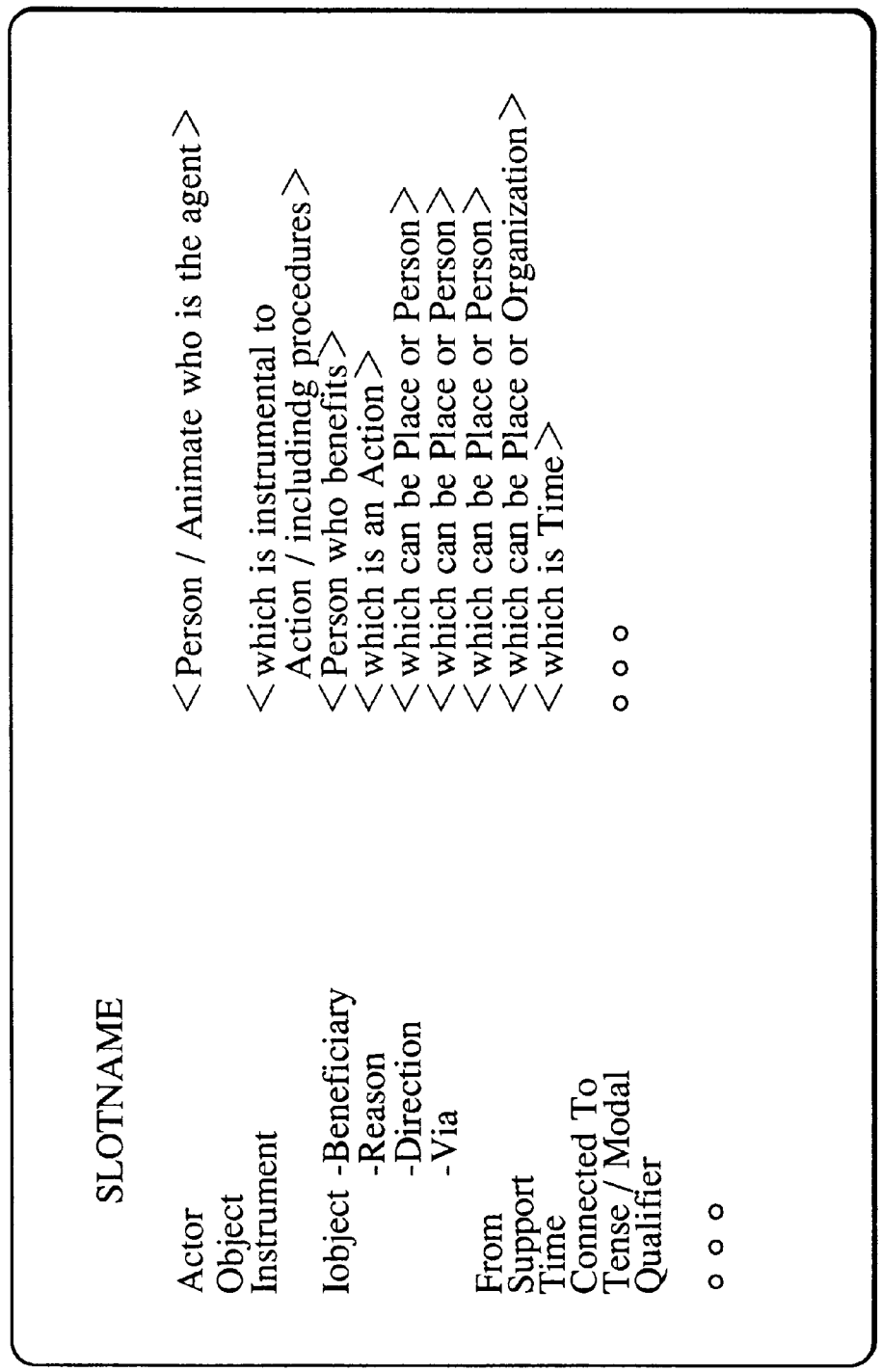
FIG. 7 shows the structure of the concept of PTRANS.

FIGS. 3 to 8 show examples of a concept structure. FIG. 3 shows the structure of concepts of an action. FIG. 4 shows an example of an action. FIG. 5 shows the structure of the concept of MEET. FIG. 6 shows the structure of the concept of MTRANS. FIG. 7 shows the structure of the concept of PTRANS. FIG. 8 shows the structure of the concept of AGREEMENT.

Figure 9:
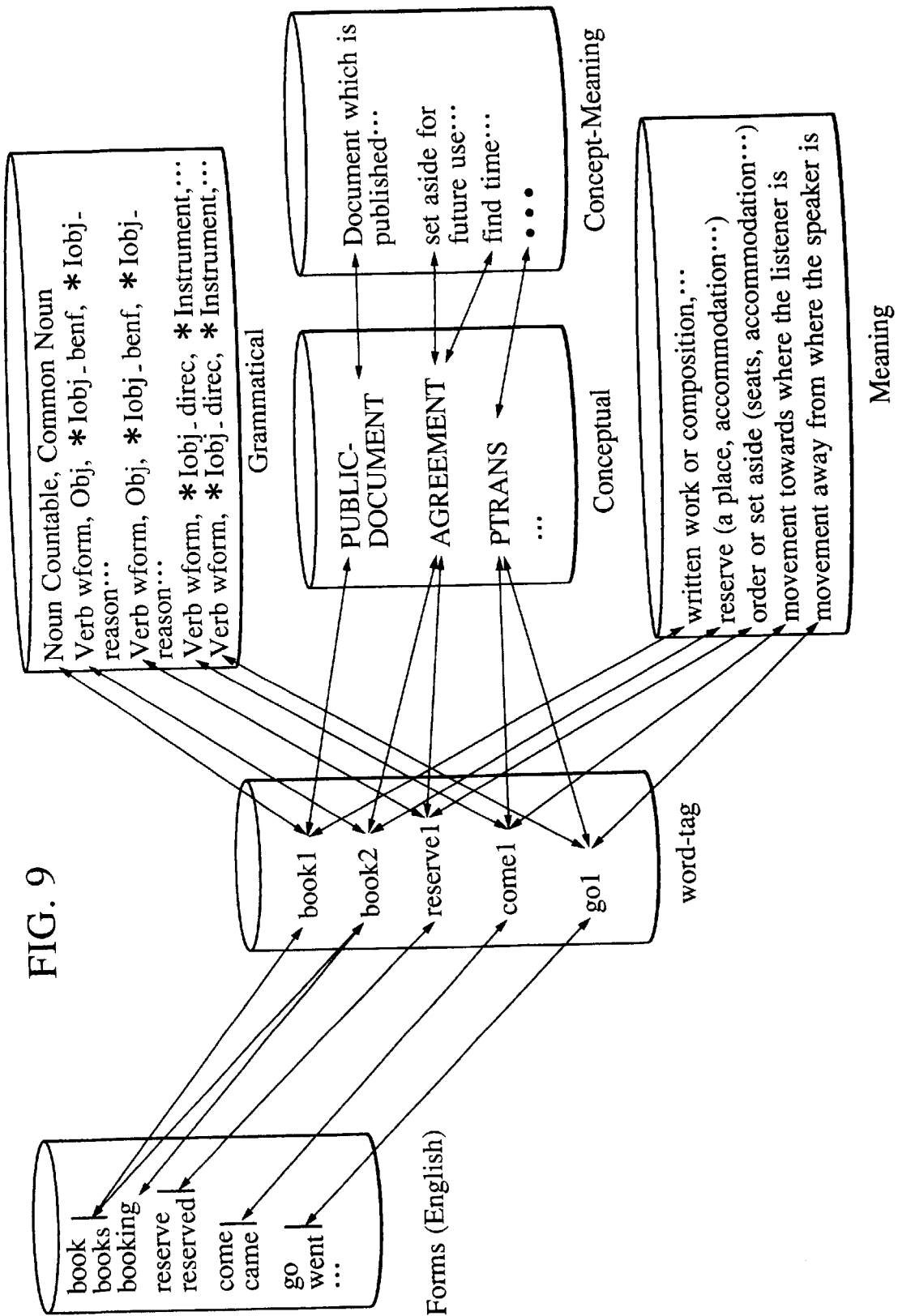
FIG. 9 shows the structure of a linguistic knowledge base (LKB)

FIGS. 9 to 12 show examples of language knowledge of a knowledge base. FIG. 9 shows the structure of a linguistic knowledge base (LKB). FIGS. 10A and 10B show an example of a form dictionary. FIG. 11 shows an example of a concept dictionary. FIG. 12 shows an example of grammar.

Figure 13:
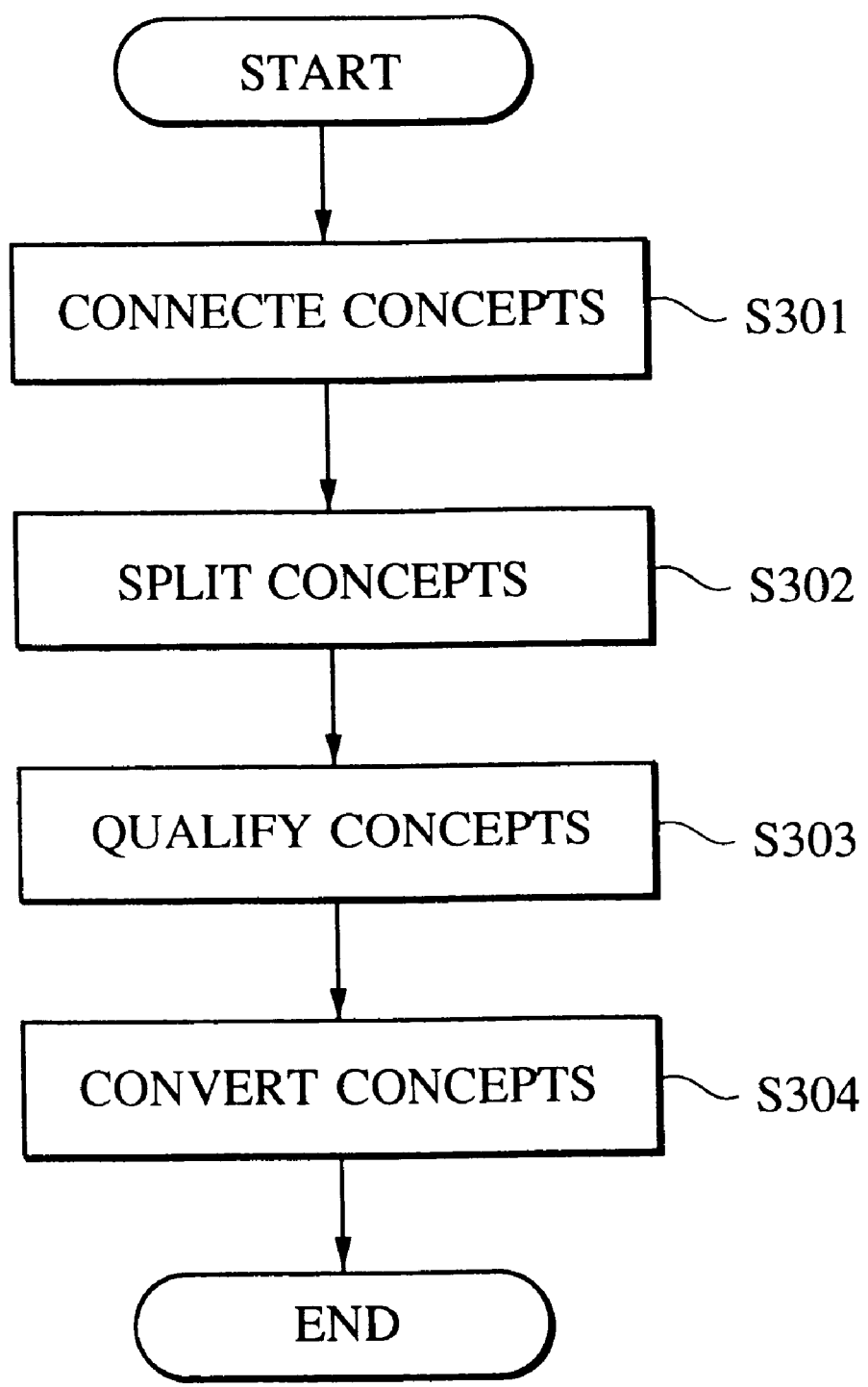
FIG. 13 is a flowchart of the procedural steps of a pregenerator of the embodiment.

FIG. 13 is a flowchart of the procedural steps of the pregenerator 21 of this embodiment. The pregenerator 21 has a plurality of mutually different functions. First, continuous concepts are connected (step S301), a complex, incomprehensible concepts is split (step S302), and the concepts are qualified according to the features of each language, the style of the person, social and cultural rules, etc. (step S303). Here, by "qualify" is meant to not only add information, but also delete unnecessary or redundant portions. The qualified concepts are then converted in step S304 and the process ends.

Figure 14:
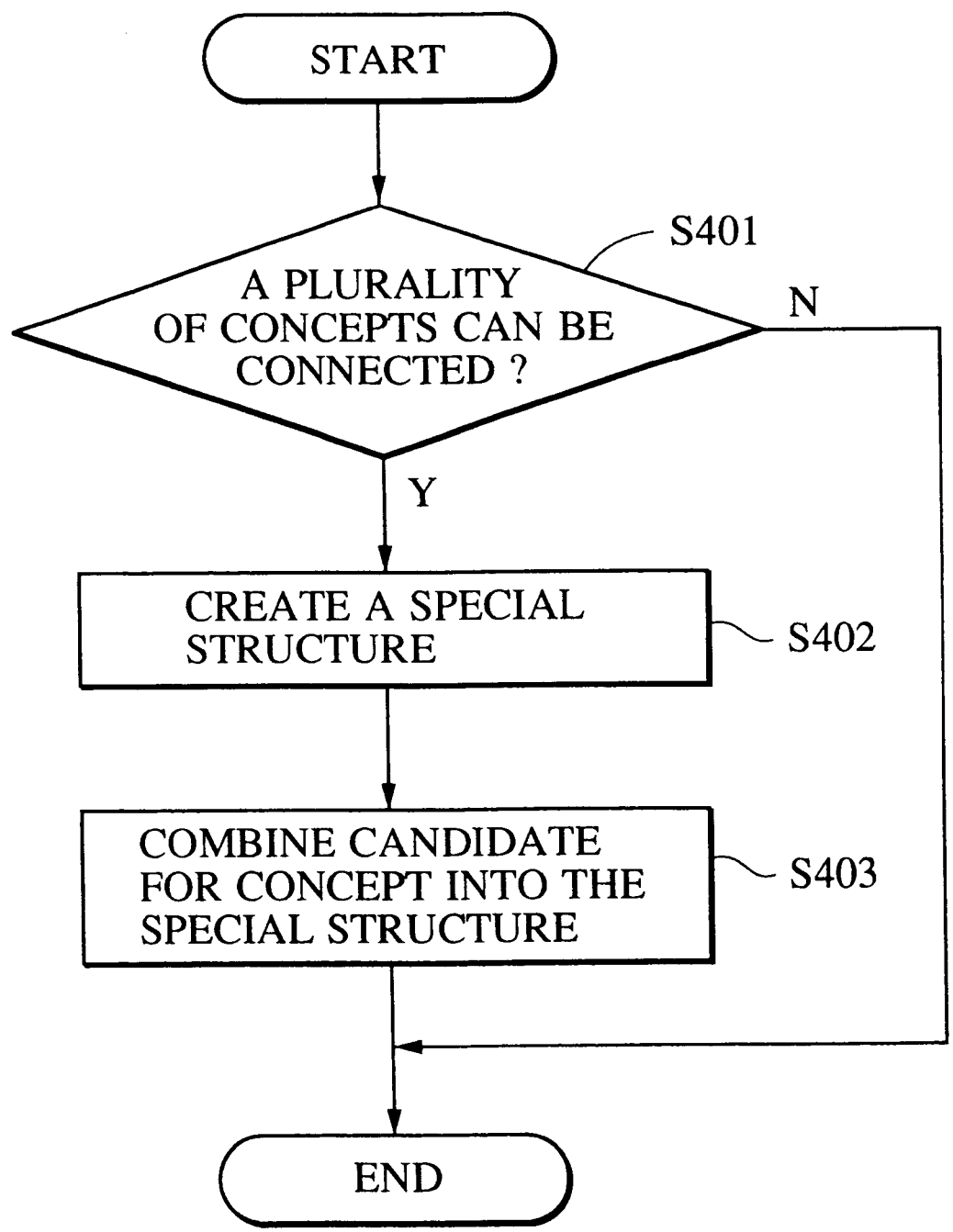
FIG. 14 is a detailed flowchart of a process for connecting concepts.

FIG. 14 is a detailed flowchart of a process for connecting concepts. In this example, two or more concepts are connected according to a certain rule. When the connection is successful, a special structure called Coord or condn is created. Thus, step S401 determines whether the concepts can be connected. If they can't, the process ends. If they can, step S402 creates a special structure, then step S403 combines candidates for the concepts into the special structure, and the process ends.

Figure 15:
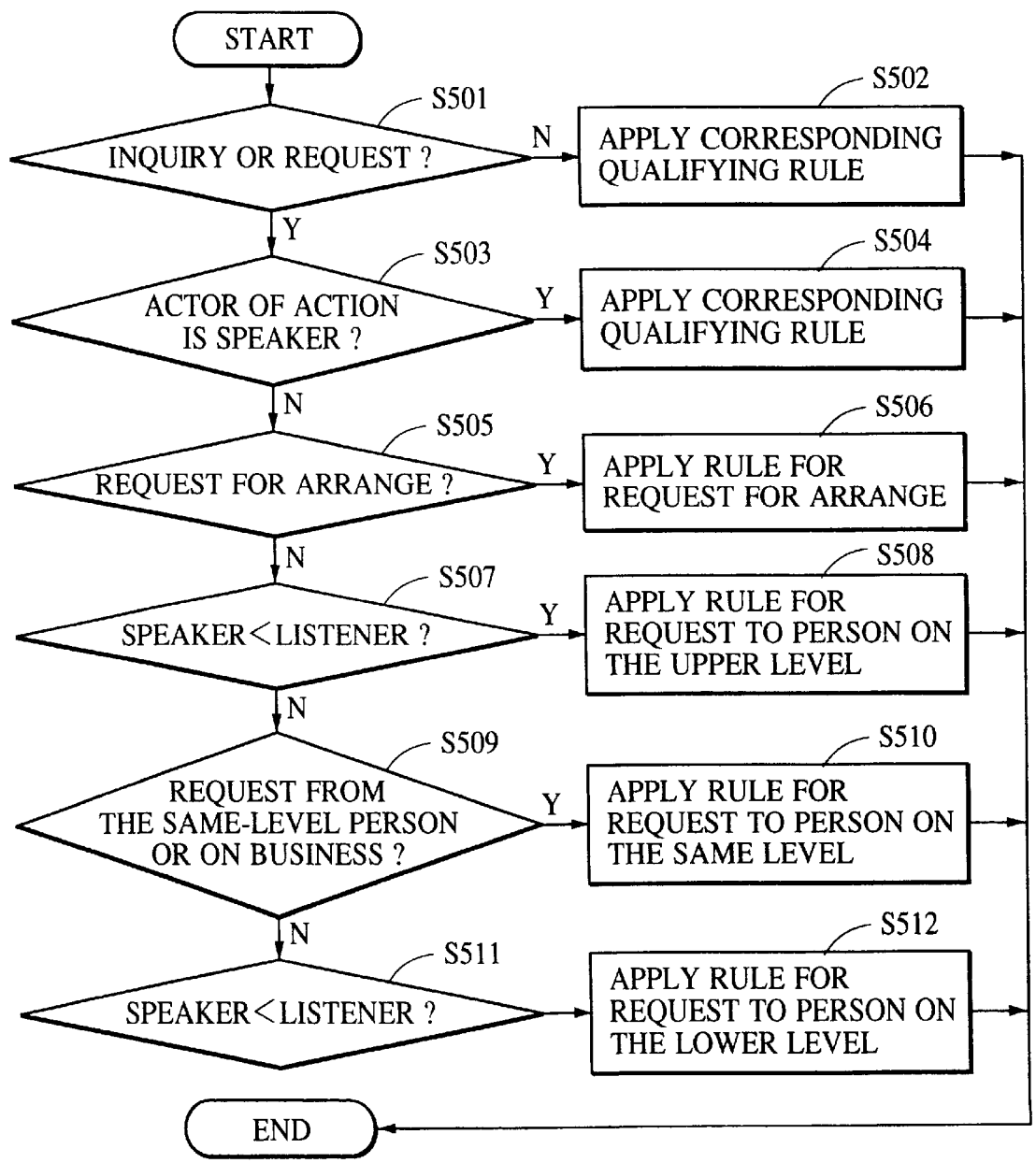
FIG. 15 is a flowchart of a process for beatifying an action.

FIG. 15 is a flowchart of a process for qualifying an action. Referring to FIG. 15, if, for example, the action is an inquiry or request from the speaker to the listener, the process proceeds to step S505; if the action is a request of arrange, the rule for qualifying the arrange request is applied in step S506. If the action is neither an inquiry nor request, a related rule is applied according to the status relationship between the speaker and the listener (steps S507 to S512). Here, the status relationship is assumed to be prestored as knowledge in the knowledge base. In the expression of knowledge, the relative relationship, when a person is seen from another person, such as his/her teacher, his/her superior, or his/her subordinate, may be described as being attributes of the other person, or, the organization to which each person belongs, the rank, etc. may be provided as knowledge. More specifically, step S501 determines whether an inquiry or request is to be output. If not, step S502 applies a corresponding qualifying rule and the process ends. If so, the method proceeds to step S503, which determines whether the actor of the action discussed in the inquiry or the request is the speaker. If so, step S504 applies the corresponding qualifying rule and the process ends. If not, step S505 determines whether the inquiry or request is an arrange request. If so, step S506 applies a rule for the arrange request and the process ends. If not, step S507 determines whether the speaker is lower status than the listener. If the speaker is lower status than the listener, step S508 applies a rule for making a request to a person of a higher status level and the process ends. If not, step S509 determines whether a request is made from a speaker to a listener who are both on the same status level or whether the request involves business. If so, step S510 applies a rule for making a request to a person on the same status level and the process ends. If not, step S511 again determines whether the speaker is lower status than the listener. If the speaker is not lower status than the listener, step S512 applies a rule for making a request to a person of a lower status level. If the speaker is determined to be lower status than the listener in step S511, the process ends.

FIG. 16 shows an example of rules for a case of an arrange request. These rules depend upon the closeness between the speaker and the listener. FIG. 17 shows an example of rules for a case of a request to a person in an upper rank (his/her seniors). FIG. 18 shows an example of rules for a case of a request to a person in the same rank. FIG. 19 shows an example of rules for a case of a request to a person in a lower rank.

A description will be given below using a specific example. It is assumed that the input to the pregenerator 21 is concepts Con1 and Con2 of FIG. 20.

Here, Con1 indicates "I am coming to USA on business in May", and Con2 indicates "I would like to meet you on 10th May". Therefore, these two concepts can be grouped into one. Thus, the pregenerator 21 outputs one concept Coord1 shown in FIG. 21. When the two concepts are combined, the pregenerator 21 adds the phrase of "it so happens" at the beginning of the sentence. Here, Coord1 which is finally output indicates "It so happens that I am coming to USA on business in May and I shall be extremely grateful if I could meet you on 10th May 93".

Next, the input to the pregenerator 21 is assumed to be a concept Con3 of FIG. 22. Here, Con3 indicates "arrange accommodation for me".

Since this is an arrange request according to the imperative mood, the rule of FIG. 16 is applied. If it is assumed that the speaker is in a lower rank than the listener, referring to the rule of FIG. 19, Con4 of FIG. 23 is output. Con4 indicates "I shall be extremely grateful if you could kindly arrange for my accommodation".

On the other hand, if the speaker is close to the listener in the above-described input, referring to the rule of FIG. 11, Con3 of FIG. 24 is output. Here, Con3 indicates "Could you kindly arrange for my accommodation?".

Next, it is assumed that the input to the pregenerator 21 is Con5 of FIG. 25 following the above-described concept Con3 of FIG. 22. Here, Con5 indicates "How to reach your place?". For the beatification for this, the inquiry is made to be a more polite form, and since Con5 is after Con3, the output is Con6 shown in FIG. 26. This indicates "Could you also kindly suggest how I can reach your place?".

Next, an example of a weather forecast system will be considered. The sentence of a) in FIG. 27 is assumed to be an input. An actual input to the system is in the form of an internal expression, but is expressed by English in this example. This sentence is hard to read because several things are described. Therefore, the pregenerator 21 applies a rule for trimming the connected actions. As a result, an output such as that shown in b) of FIG. 27 is obtained.

Tense and mood are features of a language. In the internal knowledge expression, an action has an absolute time. The pregenerator 21 selects proper tense and mood in the expression of the target language on the basis of the absolute time, context, and the relationship and friendship between the speaker and the listener.

FIG. 28 shows an example of rules of the mood. The input shown in FIG. 29 is assumed to be an input. This input indicates "I write to you about my plan". The pregenerator 21 obtains Con7 of FIG. 30 with the tense as the future and with the mode as the objective. This indicates "I shall write to you about my plan".

In order to make the sentence easy to understand and be in order, there is a case in which some kinds of matters or the point may be repeated. As an example, a) of FIG. 31 is assumed to be an input from the sentence generator. In FIG. 31, the input is expressed by a natural language for easy understanding; however, an actual input is formed in an internal expression.

In a) of FIG. 31, as a closing remark, the sentence generator selects a standard "Thanking you". However, if the sender of the letter is afraid that the recipient might forget to make a reservation because of the length of the letter and other things, it is natural that the important thing is repeated in the closing portion. Therefore, the output of the pregenerator 21 becomes as b) of FIG. 31.

The pregenerator 21 needs to provide a hint to make the sentence easy to read to a module which follows the pregenerator, such as a generator which converts a concept expression into natural language.

For example, to output "I will be in Osaka from the 5th to 10th and then I will be visiting Kyoto. I will return to Osaka on the 14th ...", the selection of the word return with respect to concept PTRANS cannot be made unless the fact that person was once at that place (Iobj-direction) is taken into consideration. Therefore, it is impossible for the generator 23 to make the selection. Thus, the pregenerator 21 provides this information to the generator 23.

Figure 32:
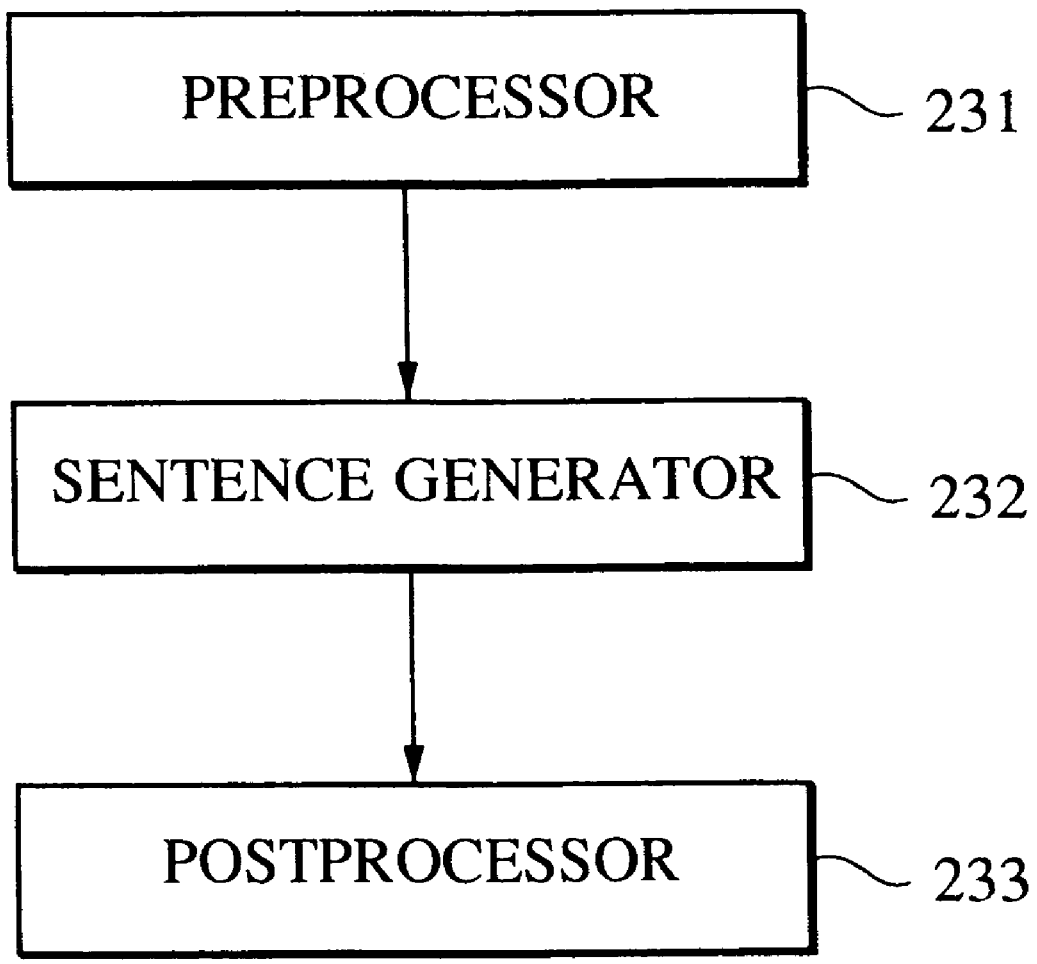
FIG. 32 is a block diagram illustrating a detailed structure of the generator.

FIG. 32 is a block diagram illustrating a detailed structure of the generator.

As shown in FIG. 32, the generator 23 consists of a preprocessor 231, a sentence generator 232, and a postprocessor 233. A list of internal expressions (e.g., Action(s), Action(s)+Templates, Concepts . . .) is input to the preprocessor 231 from another system (the pregenerator 21, a document generator, an interactive processor, etc.). The output of the preprocessor 231 is processed by the sentence generator 232 for converting the internal expression into natural language, such as English. The postprocessor 233 performs post-editing, internal feedback, and the like.

Figure 33:
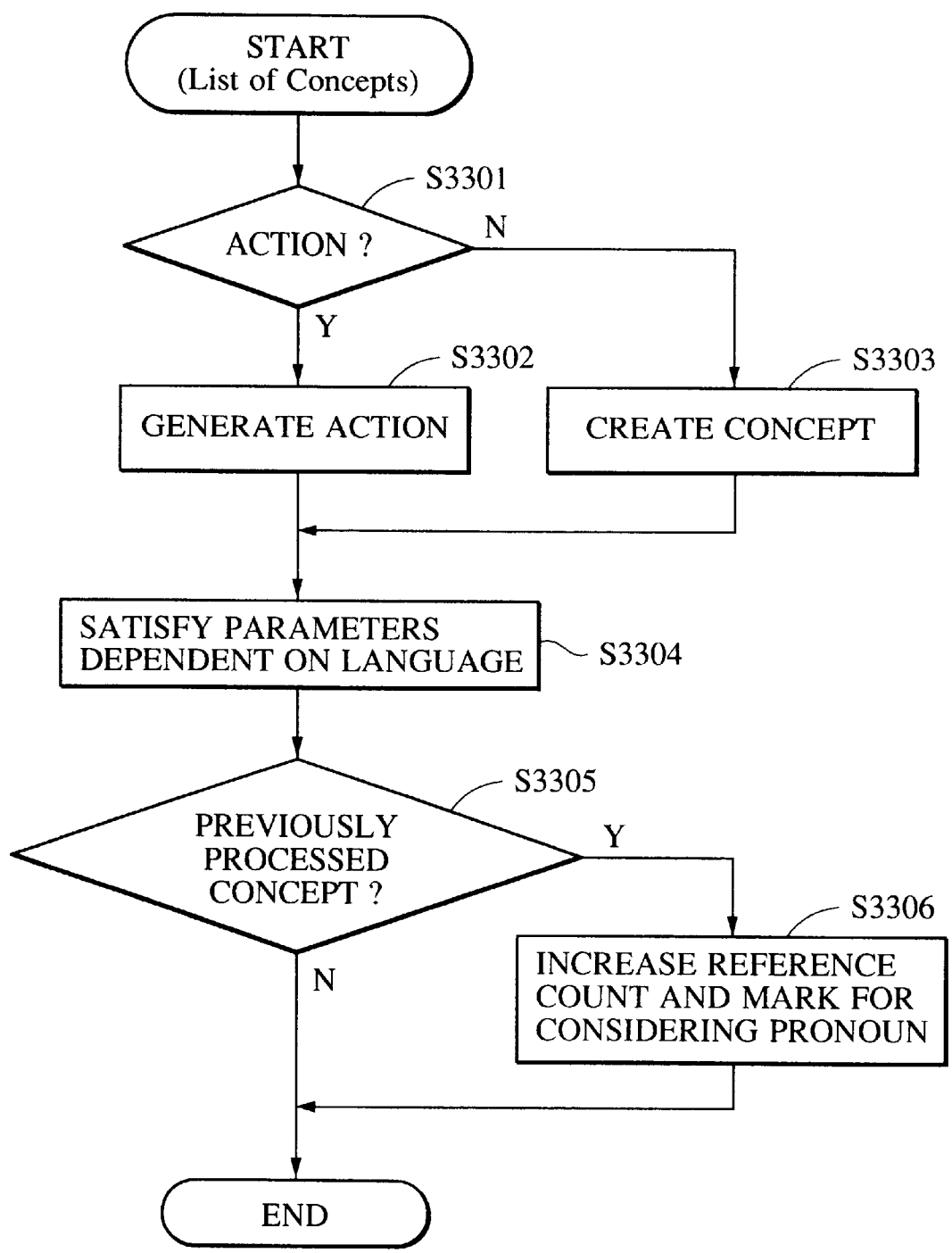
FIG. 33 is a flowchart illustrating the procedural steps of the preprocessor.

FIG. 33 is a flowchart illustrating the procedural steps of the preprocessor 231. The main function of the preprocessor 231 is to generate a linguistic concept for adding a feature dependent upon the language to the input concept (step S3303). Features dependent upon the language include gender, number, case (nominative case, objective . . .), and person (first person, second person . . .). The preprocessor 231 determines the style and the expression form while seeing through the entire concept to be described, and passes the style and the expression form to the sentence generator 232 with the style and the expression form as guidelines. The guideline includes the form of the pronoun and the approximate center of the contents. Thus, at the beginning of this process a list of internal expressions or concepts is input into the preprocessor 231. Next, step S3301 determines whether the input internal expressions include an action. If they don't, step S3303 creates a linguistic concept for adding a feature dependent upon the language to the input internal expression. If they do, step S3302 generates data representing an action. In either case, step S3304 then satisfies parameters dependent on language and then step S3305 determines whether the method is processing a previously processed concept. If not, the process ends. If so, step S3306 increases a reference count and marks the concept with a pronoun.

Figure 34:
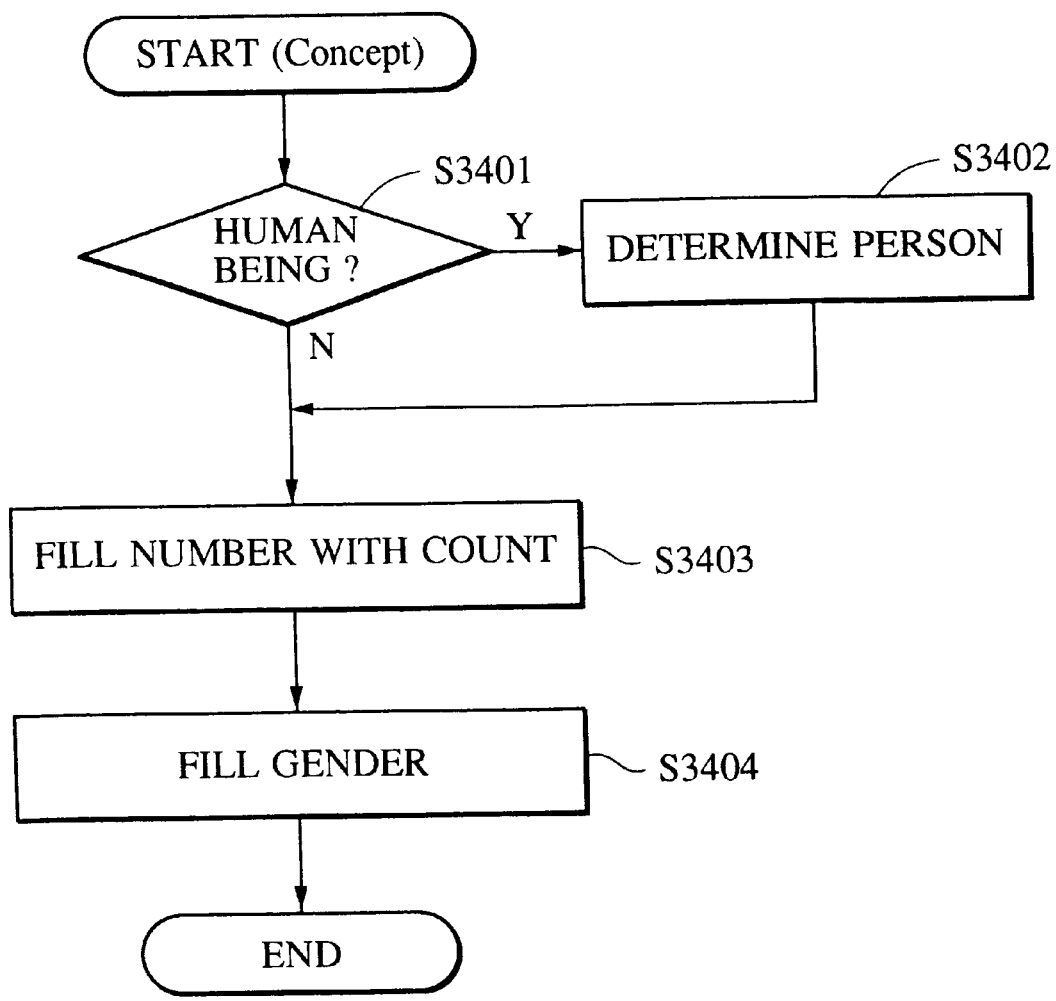
FIG. 34 is a flowchart illustrating the procedural steps for satisfying parameters dependent upon a language.

FIG. 34 is a flowchart illustrating the detailed procedural steps of a process for satisfying parameters dependent upon a language. When the concept is a human being (step S3301), the person is determined (step S3402), the number is filled with the count (step S3403), and the gender is filled (step S3404). In addition, if step S3401 determines that the concept is not a human being, the method also proceeds to step S3403.

Figure 35:
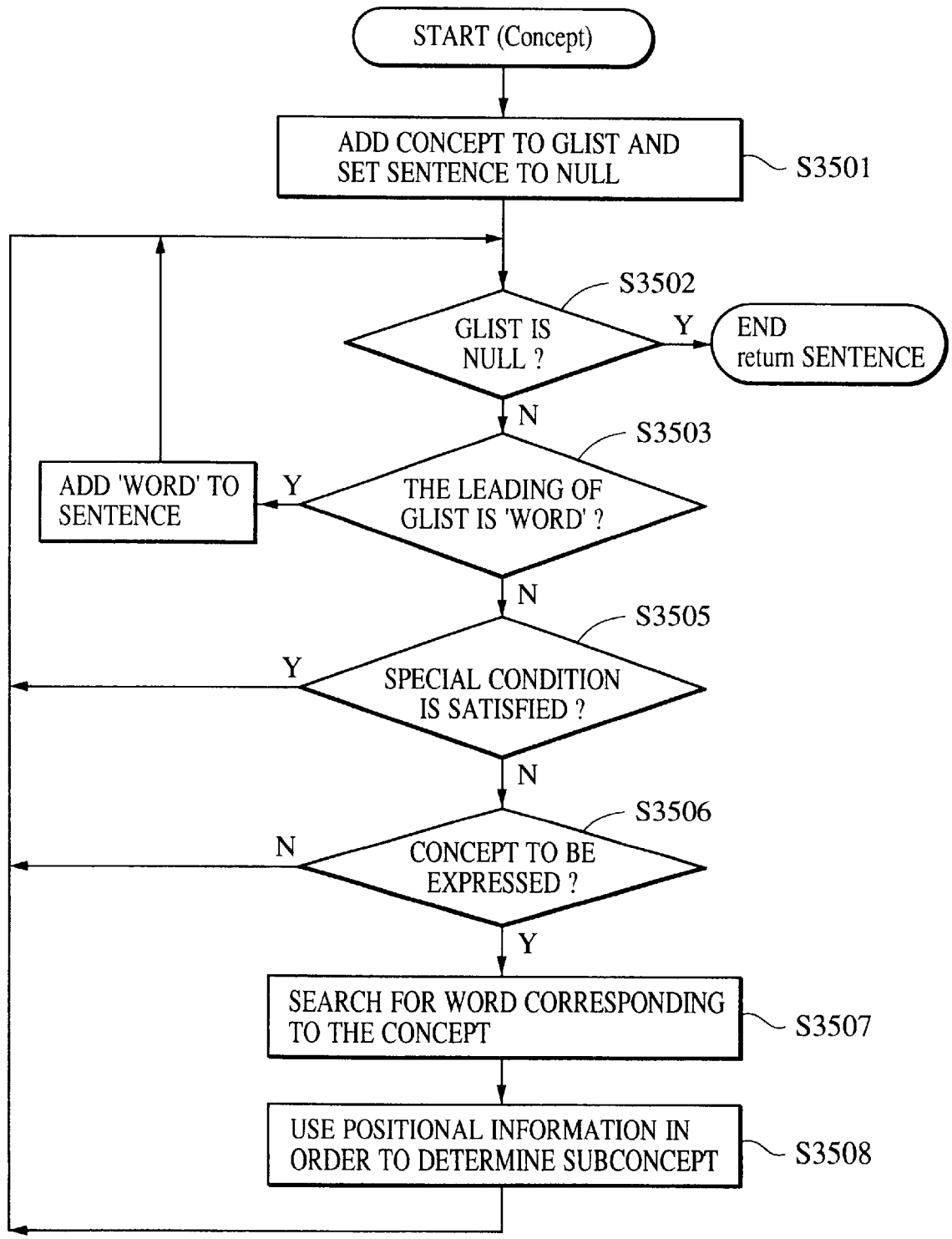
FIG. 35 is a flowchart illustrating the procedural steps of a sentence generator.

FIG. 35 is a flowchart illustrating the procedural steps of the sentence generator 232.

Initially, in step S3501, the input concept is added to GLIST, and SENTENCE is set to null.

In step S3502, a check is made to determine if GLIST is null. If it is null, SENTENCE is output, and the process is terminated. If the GLIST is not null, a check is made in step S3503 to determine if the leading item of GLIST is a word. If the leading item of GLIST is a word, the word is added to the SENTENCE in step S3504, and the process returns to step S3502.

If the leading item is not a word in step S3503, the process proceeds to step S3505 where a check is made to determine if a special condition is satisfied. If so, the process returns to step S3502. If a special condition is not satisfied, the process proceeds to step S3506 where a check is made to determine if the condition is the first concept to be expressed. If not so, the process returns to step S3502, and if so, in step S3507, a word corresponding to the first concept in the GLIST is searched, and in step S3508, a subconcept is set on the GLIST using position information, and the process returns to step S3502.

Figure 36:
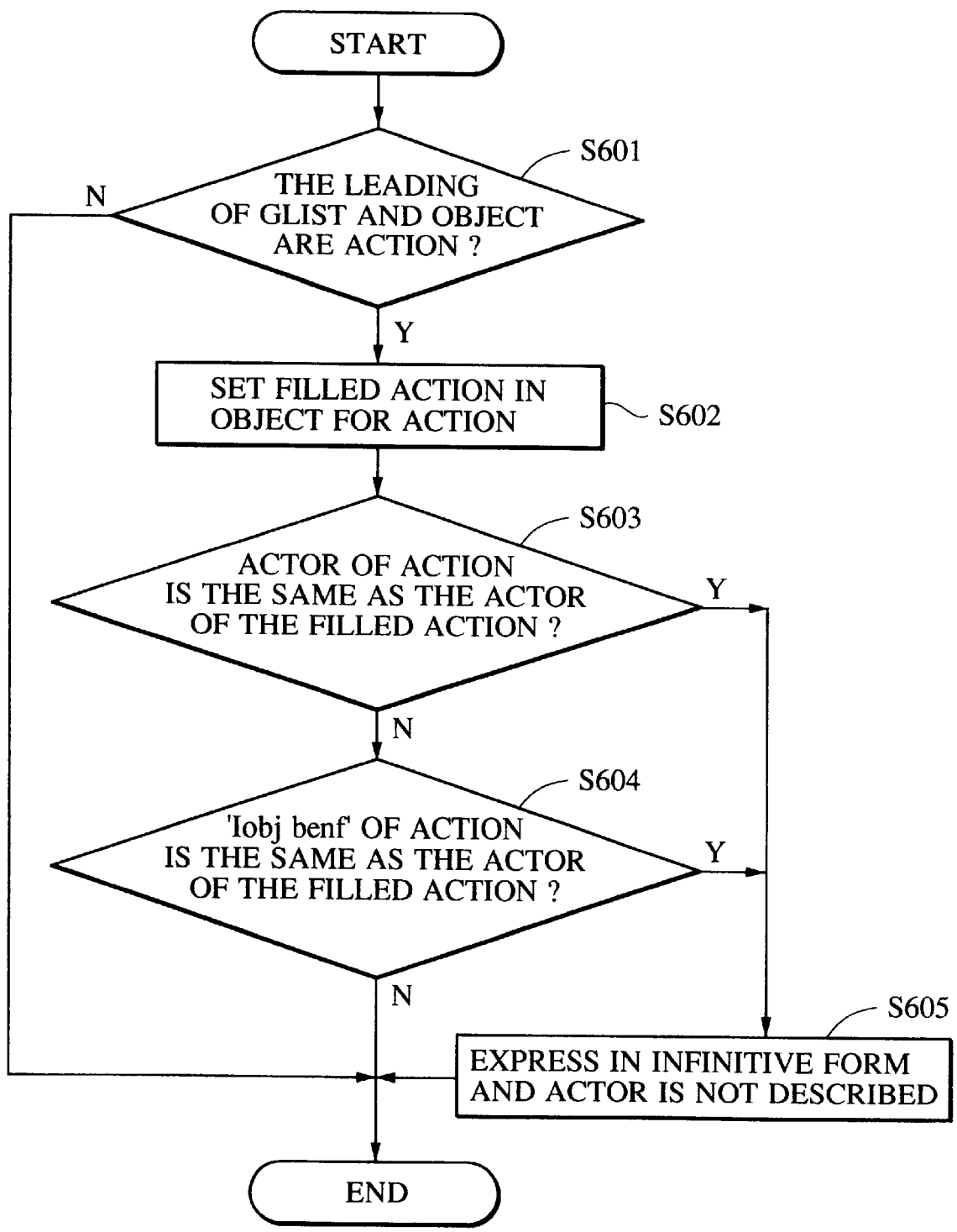
FIG. 36 is a flowchart illustrating the procedural steps regarding the conditions of an infinitive.

FIG. 36 is a flowchart illustrating the procedural steps regarding the condition of an infinitive, which is one of the special conditions. In FIG. 36, the condition of the infinitive determines whether a tag is attached to indicate whether a certain concept should be written in an infinitive form, or an infinitive form should be used if the surface word or phrase of the verb is identified. For example, if the current concept and the object thereof is an action, it should be expressed in an infinitive form. If the actor of the filled action is the same as the actor of the action or Iobject, the actor of the filled action should be omitted. Thus, step S601 determines whether the leading item or concept of the GLIST and the object thereof is an action. If not, the process ends. If so, a filled action is set in step S602. Then, step S603 determines whether the actor of the action is the same as the actor of the filled action. If so, step S605 expresses the current concept in infinitive form and omits the actor of the filled action. If not, step S604 determines whether the 'Iobj benf' (the person who benefits from the action) is the same as the actor of the filled action. If not, the process ends. If so, step S605 expresses the current concept in infinitive form and omits the actor of the filled action, and the process ends.

Figure 37:
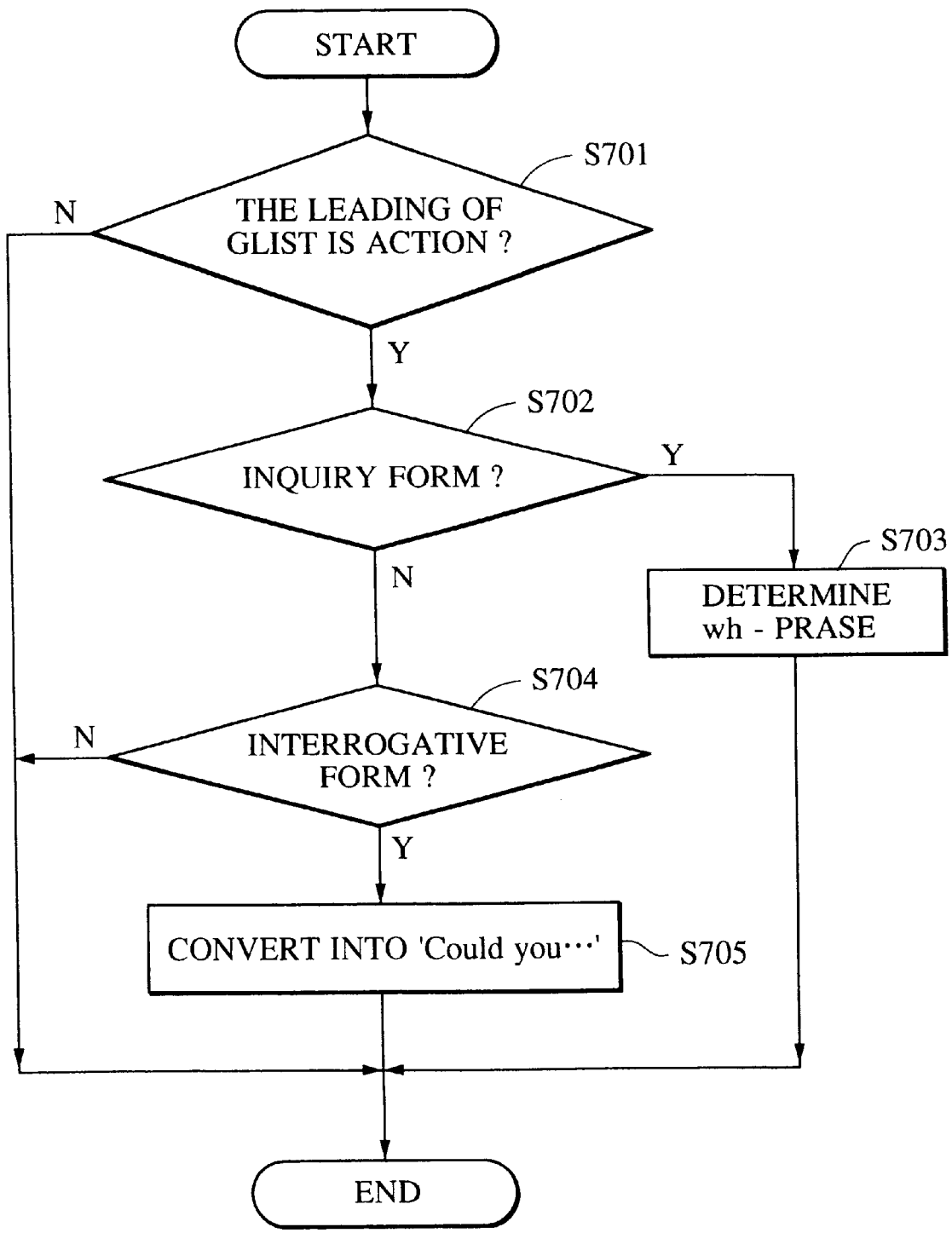
FIG. 37 is a flowchart illustrating the procedural steps regarding the conditions of an inquiry.

FIG. 37 is a flowchart illustrating the procedural steps regarding the conditions of an inquiry. If the concept of the action is described in an interrogative tone, a proper Wh-phrase (Who, When, etc.) is determined on the basis of the slot of the problem. In the case of an interrogative form, a polite sentence is generated. The tag is also set in the inversion between the subject and the auxiliary verb. This is because in English, usually, the subject is before the auxiliary verb, whereas this order is reversed in the interrogative form. Thus, step S701 determines whether the leading item of the GLIST is an action. If not, the process ends. If so, step S702 determines whether the sentence to be output is in the form of an inquiry. If so, step S703 determines the proper wh-phrase for the inputted inquiry and the process ends. If not, step S704 determines whether the sentence is in the form of an interrogative. If not, the process ends. If so, step S705 generates a polite sentence starting, for example, with the words "Could you." and the process ends.

Figure 38:
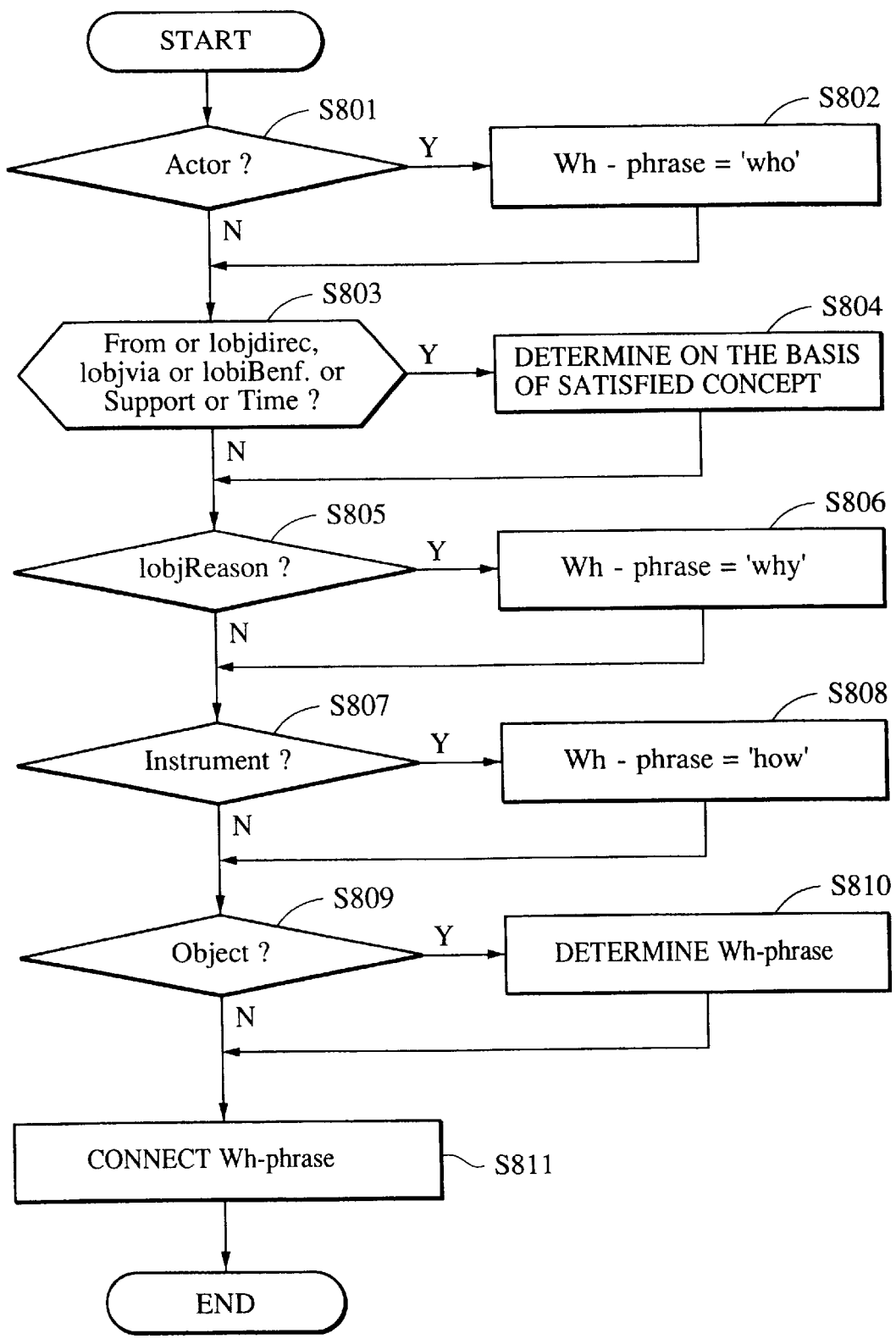
FIG. 38 is a flowchart illustrating the procedural steps for determining a Wh-phrase with respect to English.
Figure 39:
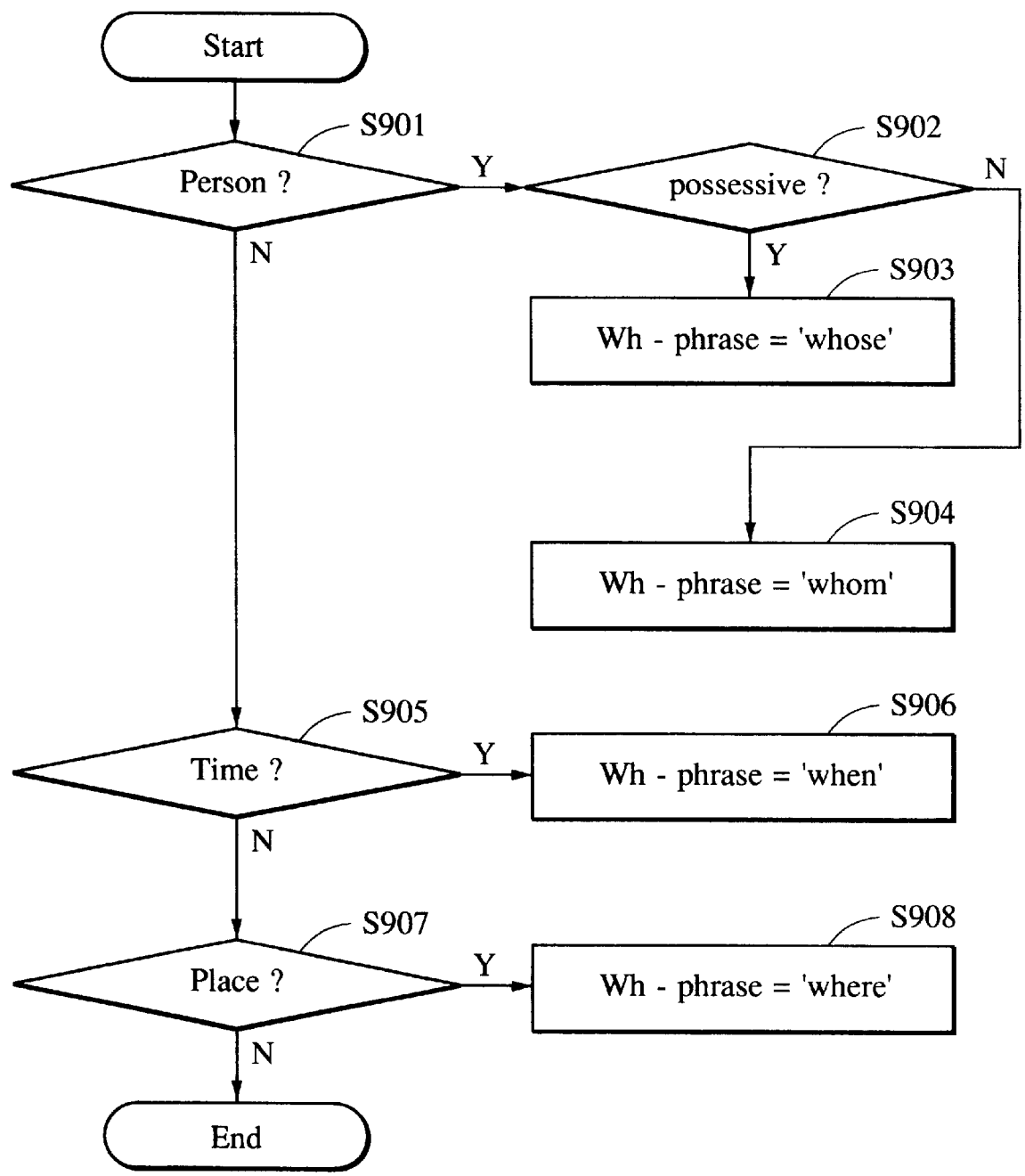
FIG. 39 is a flowchart illustrating the procedural steps for determining a Wh-phrase with based on a concept.

FIG. 38 is a flowchart illustrating the procedural steps for determining a Wh-phrase with respect to English. FIG. 39 is a flowchart illustrating the procedural steps for determining a Wh-phrase on the basis of the concept. Thus, in FIG. 38, step S801 determines whether an actor is to be mentioned in an inquiry to be output. If so, step S802 determines that the Wh-phrase to be included in the inquiry is a who phrase and the process proceeds to step S803. If not, step S803 determines whether the inquiry to be output is to include concepts such as "from", "direction", "via", "the person who benefits from the action", "support", and "time". If so, step S804 determines these concepts and the process proceeds to step S805. If not, step S805 determines whether the inquiry to be output is to include a reason for a particular action. If so, step S806 determines that the Wh-phrase to be included in the inquiry is a why phrase and the process proceeds to step S807. If not, step S807 determines whether the inquiry to be output is to include things which are instrumental to the action, including procedures for performing the action. If so, step S808 determines that the Wh-phrase to be included in the inquiry is a how phrase and the process proceeds to step S809. If not, step S809 determines whether the inquiry to be output is to include the object of the action. If so, step S810 determines the Wh-phrase to be used in the inquiry and the process proceeds to step S8 11. If not, step S8 11 connects a Wh-phrase and the process ends.

In FIG. 39, step S901 determines whether a person is to be mentioned in the inquiry to be output. If so, step S902 determines whether the possessive form of the person is to be used. If step S902 determines that the possessive form of the person is to be used, step S903 determines that the Wh-phrase to be used is 'whose'. If not, step S904 determines that the Wh-phrase to be used is 'whom'. If step S901 determines that a person is not to be mentioned in the inquiry to be output, step S905 determines whether the time is to be mentioned. If so, step S906 determines that the Wh-phrase 'when' is to be used. If not, step S907 determines whether a place is to be mentioned in the inquiry to be output. If so, step S908 determines that the Wh-phrase 'where' is to be used. If not, the process ends.

The following are special conditions other than the above.

When the concept has a special linguistic structure, for example, coord (AND),REASON,CONDN, and when the combined concept is split and placed in the GLIST, the repetition of the slot of the actor is omitted.

When the concept is a noun or adjective, an appropriate article may be provided as required.

When the concept is a relation, an appropriate action is performed in accordance with the type of the relation. When, for example, the relation is "together", then "and", "or", or "with" is determined. When the relation is "possession", a determination is made as to whether the relation should be made to be the form of John's book or book of John.

Figure 40:
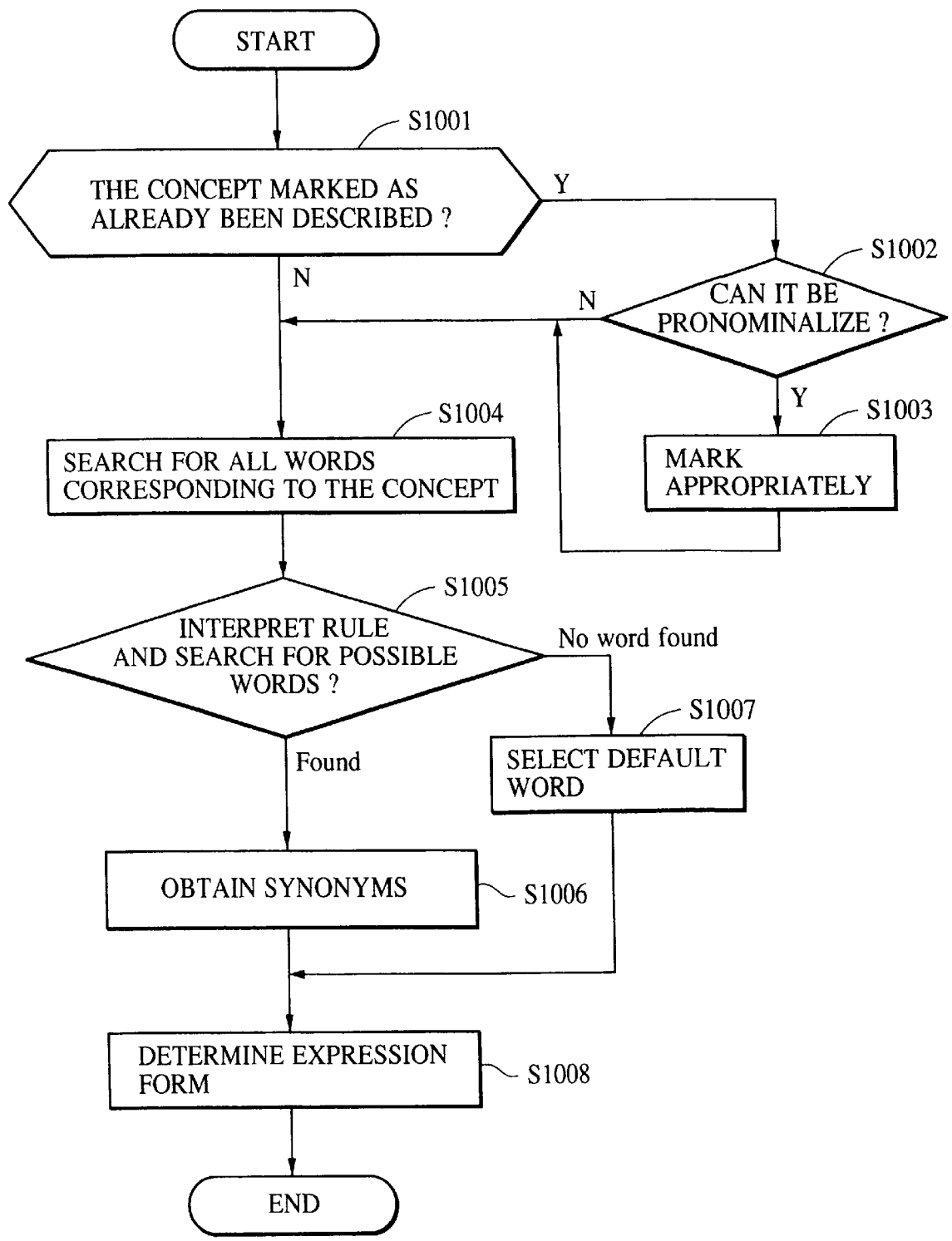
FIG. 40 is a flowchart illustrating the procedural steps for seeking a surface word of a concept.

FIG. 40 is a flowchart illustrating the procedural steps for seeking a surface word of a concept. Initially, a check is made to determine if the concept has already been stated, or the concept has been marked by a pronoun (step S1001). If so, a pronoun capable of describing the concept is used (step S1002) and the concept is marked appropriately (Step S1003). If not so, the knowledge base of the language is searched (step S1004), and all words corresponding to the concept are extracted (step S1005). If step S1005 does not find words corresponding to the concept in the knowledge base, step S1007 selects a default word. If step S1005 does find words corresponding to the concept in the knowledge base, step S1006 obtains synonyms thereof and step S1008 determines the expression form of the concept. The generator searches a personal database or a user entry dictionary in order to obtain words desired by the user. This search is performed as described below.

Figure 41:
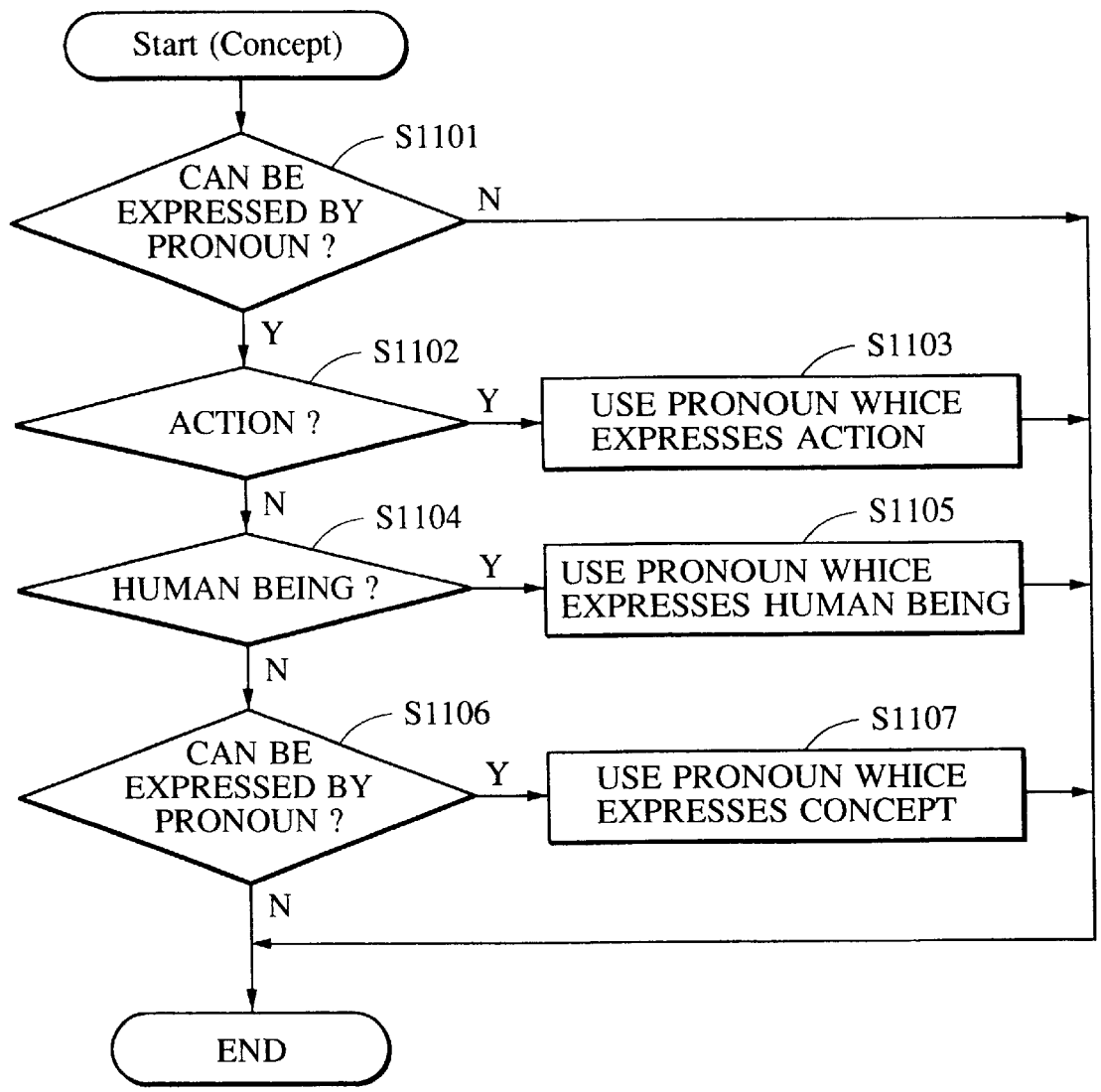
FIG. 41 is a flowchart illustrating the procedural steps for determining a pronoun.

First, the concept dictionary shown in FIG. 41 is searched for each concept. All the related word tags are retrieved together with their respective use conditions and limitations. These conditions and limitations are interpreted, and a word tag which matches best is searched (step S1005). When this is detected, the synonyms thereof are retrieved (step S1006), and stored together with the grammar information of the concept.

FIG. 41 is a flowchart illustrating the procedural steps for determining a pronoun. Initially, a check is made to determine if the concept can be expressed using a pronoun (step S1101). If, for example, ambiguity increases as a result of using the pronoun, the pronoun is not used. The pronoun which is used actually is determined in accordance with parameters, such as the type of the concept, the gerund, or the person (steps S1102 to S1107). Thus, if step S1101 determines that the concept cannot be expressed using a pronoun, the process ends. If so, step S1102 determines whether the concept can be expressed as an action. If so, step S1103 uses a pronoun which expresses the action and the process ends. If not, step S1104 determines whether the concept represents a human being. If so, step S1105 uses a pronoun which represents a human being and the process ends. If not, step S1106 determines again whether the concept can be expressed by a pronoun. If so, step S1107 uses the pronoun which expresses the concept and the process ends. If not, the process ends.

Figure 42:
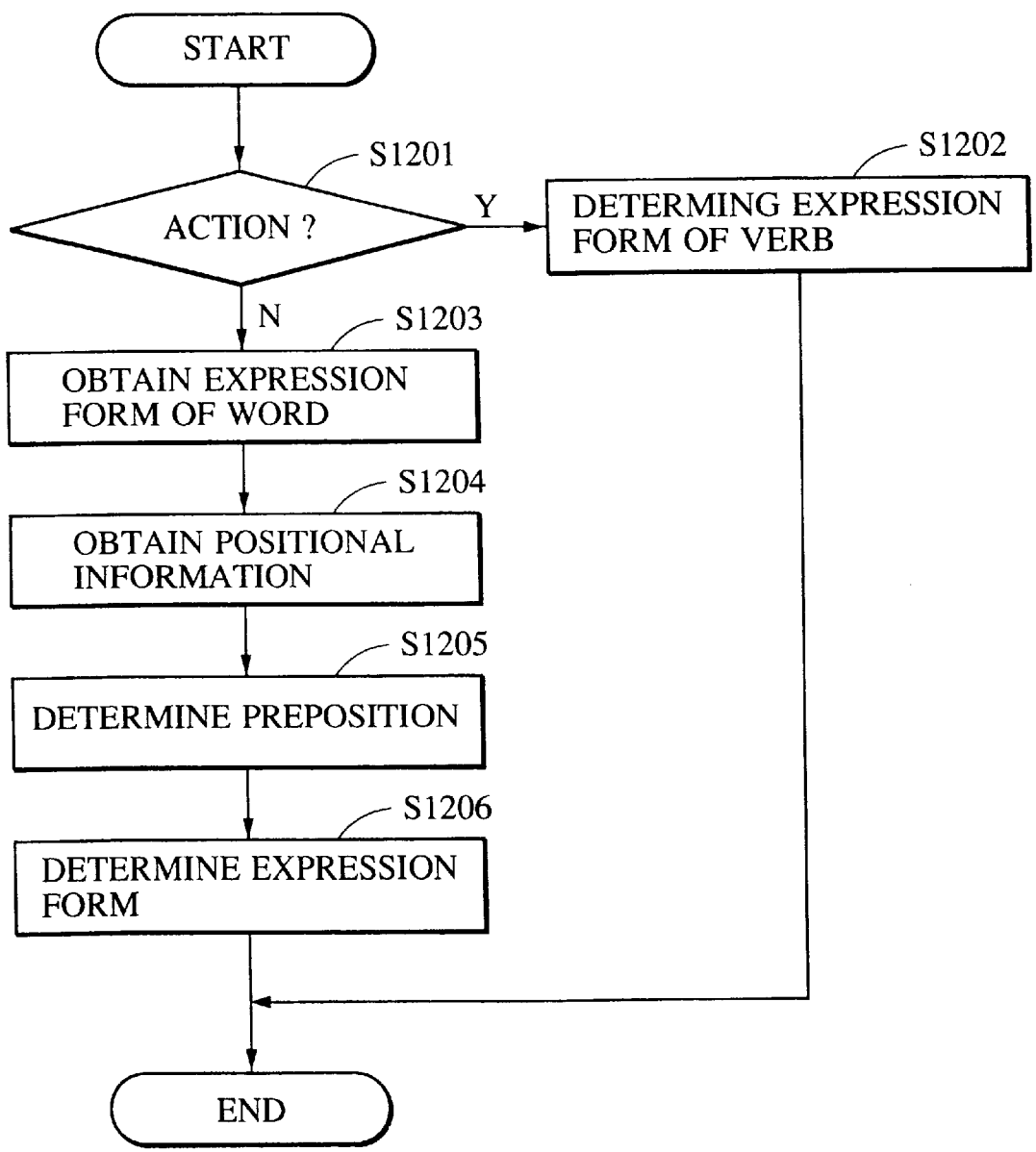
FIG. 42 is a flowchart illustrating the procedural steps for determining a surface word.

FIG. 42 is a flowchart illustrating the procedural steps for determining a surface word. If the concept is an action, (step S1201) the form of expressing the verb is determined (step S1202). If the concept is not an action, the base form is determined from the word tag by retrieving the form dictionary shown in FIGS. 10A and 10B (step S1203), and related position information is obtained (step S1204). The position information and the syntax determines the form of expressing the subconcept and the slot of the concept. A preposition is determined for the slot requiring a preposition (step S1205). The final surface word is determined from the base form on the basis of the language parameters (step S1206). For example, in the case of a noun, whether the noun should be in a single form or a plural form is determined on the basis of the number, the gender, etc.

Figure 43:
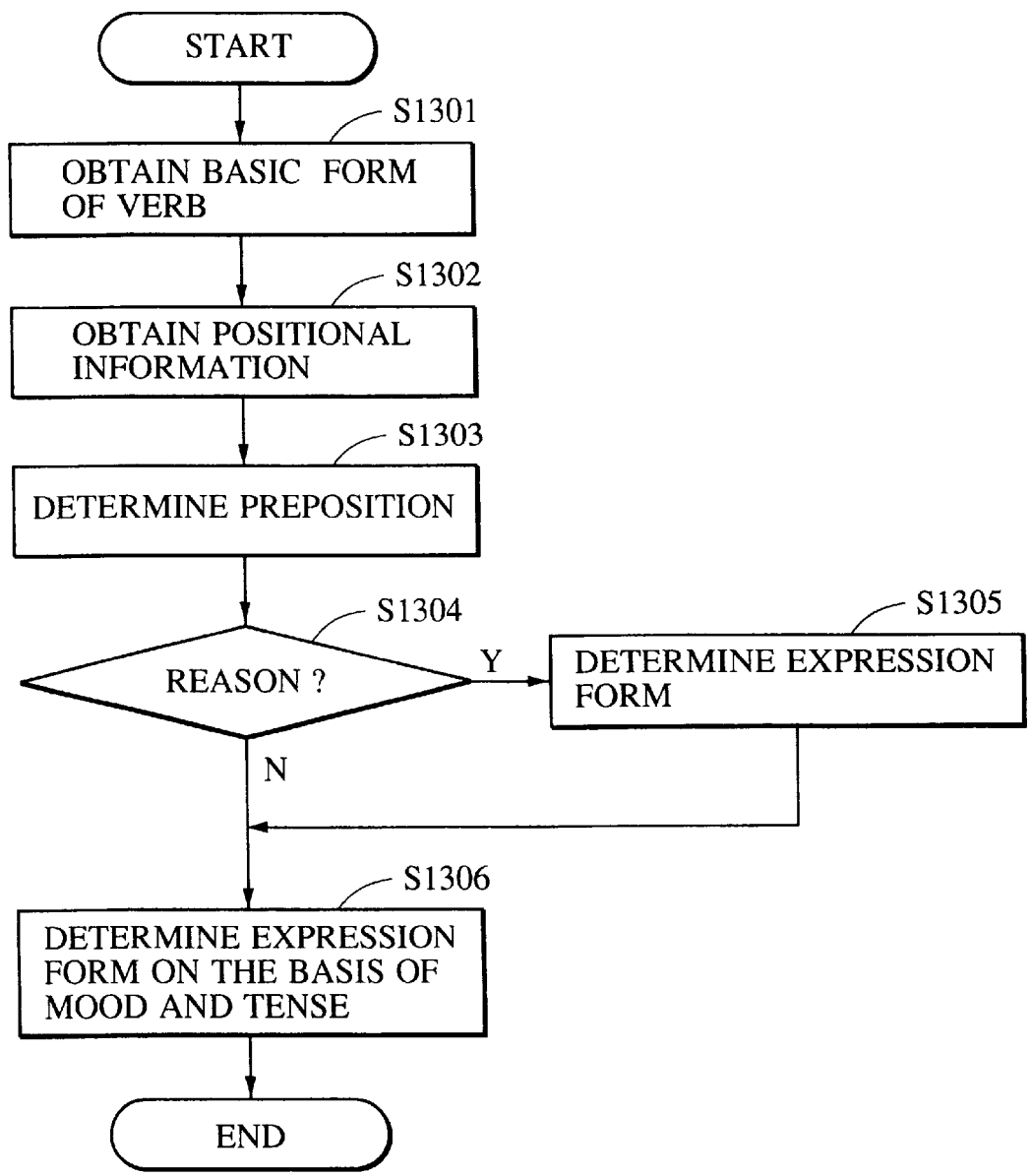
FIG. 43 is a flowchart illustrating the procedural steps for determining a surface word in the case of a verb.

FIG. 43 is a flowchart illustrating the procedural steps for determining a surface word in the case of a verb. Initially, the base form is determined from the word tag by retrieving the form dictionary shown in FIG. 10 (step S1301). Related position information and the syntax also determines the form of expressing the subconcept and the slot of the concept (step S1302). A preposition is determined for the slot requiring a preposition by applying a grammar rule (step S1303). Next, the process determines whether the verb is a reason for a certain action (step S1304). When the verb is a reason (object) for a certain action, there are two expression forms in English: the infinitive form and the gerund form, and which one of the forms should be taken is determined (step S1305). Which form the final surface word should take is determined on the basis of the mood, the auxiliary verb, and the tense (step S1306). The surface word is also affected by any one of the infinitive form and the gerund form the verb is expressed. When the verb is not a reason object for a certain action, the method proceeds from step S1304 to S1306, where the expression form of the final surface word is determined on the basis of the mood and the tense.

Figure 44:
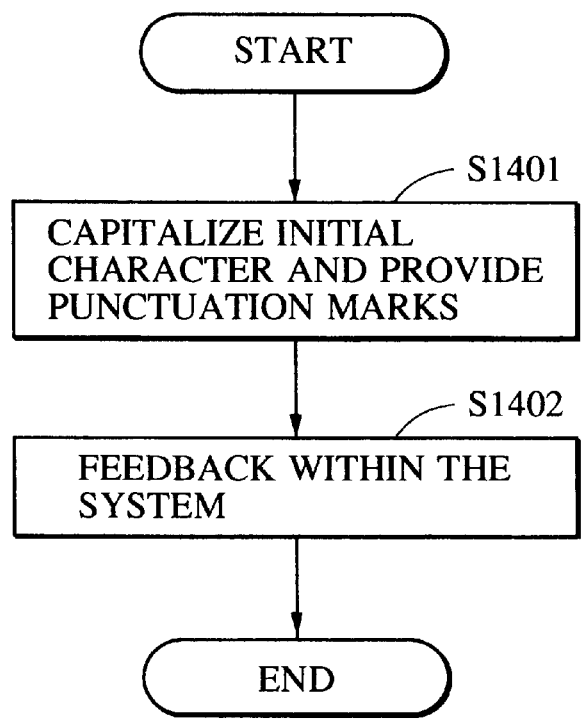
FIG. 44 is a flowchart illustrating the procedural steps of a postprocessor 23.

FIG. 44 is a flowchart illustrating the procedural steps of a postprocessor 233. The postprocessor 233, after the sentence generator 232 generates an output sentence of natural language, performs post-editing, for example, capitalizing the initial character of the sentence, or providing punctuation marks in step S1401. The postprocessor 233, in addition to these functions, checks the fitness of the generated sentence by feedback within the system in step S1402 on the basis of the supplied input and the system's understanding.

A description will be given below using a specific example. FIG. 45 illustrates an input example showing an action of type of WORK. Initially, the preprocessor 231 converts this input into a linguistic action structure shown in FIG. 46. During the conversion, linguistic parameters, such as the gender, the person, the case, etc., are determined and added. Also, the number of times the concept has been expressed is determined and added.

The procedural steps are shown in the flowchart of FIG. 35. Initially, in step S3501, LingCon1 is added to GLIST, and, as a result, the following is obtained: 101) GLIST: (LingCon1)

SENTENCE: ()

Here, since GLIST is not null, the leading item thereof is not "word", and the special condition is not satisfied, step S3507 is performed. The details of searching the word corresponding to the concept are shown in the flowchart of FIG. 40. The output is stored in the SENTENCE. Since this concept has not been mentioned before, an appropriate verb for the action is obtained from LKB of FIG. 9. This search is performed as described below.

Initially, for the input concept WORK, the concept dictionary shown in FIG. 11 is searched, and all the verbs (word tags) matching this concept are obtained together with the related condition and rule. The generator 23 evaluates this rule in order to check whether each verb can be used. The word tag obtained in this case is work1. Next, by referring to the form dictionary shown in FIGS. 10A and 10B, the form of the surface word is determined on the basis of the mood and the tense. Here, "am working" is formed.

As position information, i.e., syntax information, Actor, Verb, Object, Support, IobjReason, and Time are obtained from FIG. 12. By using the grammar rule, prepositions for each slot are determined, and transformed position information Actor, Verb, on Object, Support, IobjReason, and Time are obtained.

The above-described position information is used to set the slots of the subconcept or action on the GLIST (step S3508). As a result, the following GLIST is obtained:
102) GLIST: (Actor,'am working','on'Object,Support, IobjReason,Time)

SENTENCE: ()

The slots are set so that the actor is described using a pronoun. Since the person is the first person, "I" is selected FIG. 12, and GLIST is transformed as described below.
103) GLIST: ('I','am working','on'Object,Support, IobjReason,Time)

SENTENCE: ()

Since the first item of GLIST is a surface word, it is provided to the SENTENCE (step S3504).
104) GLIST: ('am working','on'Object,Support, IobjReason, Time)

SENTENCE: ('I')

Since the first item of GLIST is a surface word, it is provided to the SENTENCE.
105) GLIST: ('on'Object,Support,IobjReason,Time)

SENTENCE: (I am working)

In finding a word in the Work area, in the same way as in the retrieval of a verb, the surface form which expresses the Work area is Name, and the related position information obtained from LKB shown in FIG. 9 are Name, Methodology, and Since. When the preposition is determined, Name, using, Methodology, Since is formed.

"Since" is determined to be not so much important on the basis of the center of the contents, and is marked as being not expressed. In this way, the subconcept in the Work area is placed in the GLIST, and the processing is continued using FIG. 45.

106) GLIST: ('on'Name,'using'Methodology,Since, Support, IobjReason,Time)
SENTENCE: (I am working)
107) GLIST: ('on Cognitive Science','using'Methodology, Support,IobjReason,Time)
SENTENCE: (I am working)
108) GLIST: ('using'Methodology,Support,IobjReason, Time)
SENTENCE: (I am working on Cognitive Science)
109) GLIST: ('using'Methodology,Support,IobjReason, Time)
SENTENCE: (I am working on Cognitive Science)

The slot of Methodology is filled with "your theory of learning" such that a pronoun is used in "John Smith's theory".

110) GLIST: ('using your theory of learning',Support, IobjReason,Time)
SENTENCE: (I am working on Cognitive Science)
111) GLIST: (Support,IobjReason,Time)
SENTENCE: (I am working on Cognitive Science using your theory of learning)

The slot of "Support,IobjReason,Time" is determined to be not so much important on the basis of the center of the contents, and is marked as being not to be expressed. As a result, the final output becomes "I am working on Cognitive Science using your theory of learning".

Next, an input example of the type of WANT with Object MTRANS shown in FIG. 47 will be described.

Initially, the preprocessor 231 converts this input into a linguistic action structure shown in FIG. 48. During the conversion, linguistic parameters, such as the gender, the person, the case, etc., are determined and added. Also, the number of times the concept has been expressed is determined and added.

The procedural steps are shown in the flowchart of FIG. 35. Initially, LingCon1 is added to GLIST, and, as a result, the following is obtained:

201) GLIST: (LingCon2)
SENTENCE: ()

GLIST is not null, but a concept, and a special condition is checked. As a result, when the condition of the infinitive of FIG. 36 is satisfied and the verb of the surface word is found, the expression form is determined that the verb is described with a tag indicating an infinitive form. Since the actor of WANT is the same as that of MTRANS, the actor of the embedded MTRANS is not expressed.

The determination of the verb corresponding to WANT is made in the same way as in the above-described example. As a result, the surface word becomes "would like", and position information becomes "Actor,Verb,to Object,Time".

202) GLIST: (Actor,'would like','to'Object,Time)
SENTENCE: ()
Since the actor is set so as to be described using a pronoun, "I" is selected according to the person, and GLIST is updated. Hereinafter, processing is performed in the same way as in the above-described example.
203) GLIST: ('I', 'would like', 'to'Object,Time)
SENTENCE: ()
204) GLIST: ('would like','to'Object,Time)
SENTENCE: ('I')
205) GLIST: ('to'Object, Time)
SENTENCE: (I would like)

The retrieval of the word corresponding to MTRANS is performed in the same way as for the other verbs. The surface word is determined to be "discuss", and position information becomes "Actor,Verb,Object,with IobjectBenf, IobjReason,Instrument,Time".

206) GLIST: (Actor,'to discuss',Object,with IobjectBenf, IobjReason,Instrument,Time)
SENTENCE: (I would like)
Since the condition for an infinitive requires that the actor be omitted, this actor is not expressed.
207) GLIST: ('to discuss',Object,with IobjectBenf, IobjReason,Instrument,Time)
SENTENCE: (I would like)
208) GLIST: (Object,with IobjectBenf,IobjReason, Instrument, Time)
SENTENCE: (I would like to discuss)

The Work area is expressed in the same manner as in the above-described embodiment. Assuming that an input is continued, a pronoun is used, and as an appropriate pronoun, "it" is selected.

209) GLIST: (with IobjectBenf,IobjReason,Instrument, Time)
SENTENCE: (I would like to discuss it)
210) GLIST: (with IobjectBenf,IobjReason,Instrument, Time)
SENTENCE: (I would like to discuss it)
211) GLIST: (with you,IobjReason,Instrument,Time)
SENTENCE: (I would like to discuss it)
212) GLIST: (IobjReason,Instrument,Time)
SENTENCE: (I would like to discuss it with you)
The final output becomes as follows:
I would like to discuss it with you.
Next, an input example of the type WANT with Object MEET shown in FIG. 49 will be described.

Initially, the preprocessor 231 converts this input into a linguistic action structure shown in FIG. 50. The processing results at each stage are shown below. The processing steps are the same as those of the above-described embodiment.

301) GLIST: (LingCon8)
SENTENCE: ()
As a conjunction for REASON, "since" is selected.
302) GLIST: (since,LingCon6,LingCon8)
SENTENCE: ()
303) GLIST: (LingCon6,LingCon4)
SENTENCE: (since)
304) GLIST: (LingCon6,LingCon4)
SENTENCE: (since)
The position information for Come being Actor,Verb, Iobj-direction,Iobj-reason,
305) GLIST: (Actor,'am coming',Iobj-direction,Iobj-reason, LingCon4)
SENTENCE: (since)
306) GLIST: ('I','am coming',Iobj-direction,Iobj-reason, LingCon4)
SENTENCE: (since)
307) GLIST: ('am coming',Iobj-direction,Iobj-reason, LingCon4)
SENTENCE: (since I)
308) GLIST: (Iobj-direction,Iobj-reason,LingCon4)
SENTENCE: (since I am coming)
309) GLIST: (Iobj-reason,LingCon4)
SENTENCE: (since I am coming to USA)
To avoid the repetition of "to", Iobj-reason is expressed in the form of a gerund.
310) GLIST: ('for attending',Conf1,LingCon4)
SENTENCE: (since I am coming to USA)

311) GLIST: ('IJCAI conference',LingCon4)
   SENTENCE: (since I am coming to USA for attending)
312) GLIST: (LingCon4)
   SENTENCE: (since I am coming to USA for attending IJCAI conference)
   As the final output, the following is obtained:
   Since I am coming to USA for attending IJCAI conference, I would like to take this opportunity to visit you.
   Next, an input example of the type Co-ord shown in FIG. 51 will be described.
   Initially, the preprocessor 231 converts this input into a linguistic action structure shown in FIG. 52. The processing results at each stage are shown below. The processing steps are the same as those of the above-described embodiment.
401) GLIST: (Coord1)
   SENTENCE: ()
   As a surface word for Coord1, "and" is obtained from the LKB. Position information is con1,and,con2.
402) GLIST: (LingCon9,and,LingCon10)
   SENTENCE: ()
   The surface word for LingCon9 is made to be "am coming" from the LKB, and position information becomes "Actor,Verb,Iobj-direction,Iobj-reason,Time".
   Since, prior to the addition of the subconcept to the GLIST, the canned phrase slot is specified that "it so happens" is added before the sentence, GLIST is transformed as described below:
403) GLIST: ('it so happens',Actor,Verb,Iobj-direction, Iobj-reason, Time,and,LingCon10)
   SENTENCE: ()
404) GLIST: (Actor, Verb,Iobj-direction,Iobj-reason, Time, and,LingCon10)
   SENTENCE: (it so happens)
   The final output becomes as follows:
   It so happens that I am coming to USA on business in May and I shall be extremely grateful if I could meet you on 10th May 93.
   As described above, according to this embodiment, a plurality of concepts can be connected. Also, a complex, incomprehensible concept can be split. A sentence can be qualified on the basis of various factors. It is possible to generate a sentence of the expression form desired by the individual user.
   According to this embodiment, it is possible to generate a surface word, or a word and/or phrase in an expression form appropriate for individual situations from the same input concept, and a high-quality sentence can be generated.
   FIG. 53 shows an embodiment in which selecting means selects one natural language expression from plural natural language expressions. The selecting means comprises parameter determining means for determining parameters dependent on language. In turn, the parameter determining means comprises number determining means for determining the nouns in a selected natural language expression selected by the selecting means. And the number determining means comprises counting means for counting the number of times the same noun is used in the selected natural language expression selected by the selecting means.
   The present invention described above may be applied to a system constituted of a plurality of computers, or a specific computer within a system. Also, the present invention may be applied to a case in which an achievement is made by a computer executing a program. This program may be supplied from an external storage medium, and the storage medium for storing this program is within the scope of the present invention.
   Although the present invention has been described in its preferred form with a certain degree of particularity, many apparently widely different embodiments of the invention can be made without departing from the spirit and scope thereof. It is to be understood that the invention is not limited to the specific embodiments thereof except as defined in the appended claims.

We claim:

1. A natural language processing system for processing internal conceptual expressions of a computer not in a natural language so that they are converted to a message in a natural language from an author to a reader in accordance with the relationship between the author and the reader, comprising:

input means for inputting information expressed by a concept comprising an internal conceptual expression of a computer not in a natural language that is to be communicated from the author to the reader as a message embodying the concept;

a knowledge base having the knowledge of natural languages, general knowledge, and the knowledge of specific domains;

selecting means for selecting the expression form in a natural language of a message embodying the concept which is input from said input means by referring to the knowledge base, said selecting means determining the relationship between the author and the reader and determining the expression form of the message to reflect the relationship between the author and the reader by using data in said knowledge base, wherein said selecting means selects the expression form of the message from a plurality of possible expression forms embodying the concept in accordance with the determined relationship between the author and the reader;

modulation means for modulating the concept input from said input means on the basis of the expression form selected by said selecting means; and conversion means for converting the concept modulated by said modulation means into the message embodying the concept in the expression form in the natural language selected by said selecting means.

2. A system according to claim 1, wherein said knowledge base has the knowledge of the rank relation between a speaker and a listener, and said selecting means selects the expression form in the natural language on the basis of the rank relation between the speaker and the listener.

3. A system according to claim 1, wherein said selecting means selects the tense of a verb.

4. A system according to claim 1, wherein said selecting means selects the mood of a verb.

5. A natural language processing system for processing internal conceptual expressions of a computer not in a natural language so that they are converted to a message in a natural language from an author to a reader in accordance with the expression form of the message determined to be preferred by a person intended to receive the message, comprising:

input means for inputting information expressed by a concept comprising an internal conceptual expression of a computer not in a natural language that is to be communicated to a person intended to receive a message embodying the concept;

a knowledge base having the knowledge of natural languages, general knowledge, and the knowledge of specific domains;

determination means for determining information to be added to a concept input from said input means by referring to the knowledge base in consideration of precedent concepts and for selecting a message embodying the concept with the added information, said determining means determining the expression form of the message preferred by the person intended to receive the message by using data in said knowledge base and by determining the information to be added to the input concept, wherein said determining means selects the expression form of the message from a plurality of possible expression forms embodying the concept and the information to be added to the concept in accordance with the determined, preferred expression form of the message;

modulation means for modulating the concept input from said input means by adding the information determined by said determination means to the concept; and conversion means for converting the concept modulated by said modulation means into the message embodying the concept in a natural language.

6. A system according to claim 5, wherein said determination means determines a specific word and/or phrase corresponding to the input concept to be information to be added.

7. A system according to claim 5, wherein said determination means determines a specific concept to be mentioned in duplication from among input concepts to be information to be added.

8. A natural language processing system for processing internal conceptual expressions of a computer not in a natural language so that they are converted to a message in a natural language in accordance with the expression form of the message determined to be preferred by a person intended to receive the message, comprising:

input means for inputting information expressed by a concept comprising an internal conceptual expression of a computer not in a natural language that is to be communicated to a person intended to receive a message embodying the concept;

a knowledge base having the knowledge of natural languages, general knowledge, and the knowledge of specific domains;

connecting means for connecting a plurality of concepts input from said input means and outputting the connected concepts as one concept in a message embodying the one concept by referring to the knowledge base, said connecting means determining the expression form of the message preferred by the person intended to receive the message by using data in said knowledge base and by connecting the plurality of concepts by adding a connection word or phrase, wherein said connecting means selects the expression form of the message embodying the one concept from a plurality of possible expression forms embodying the one concept in accordance with the determined, preferred expression form of the message; and conversion means for converting the concept output from said connecting means into the message embodying the one concept in a natural language.

9. A natural language processing system for processing internal conceptual expressions of a computer not in a natural language so that they are converted to a message in a natural language in accordance with the expression form of the message determined to be preferred by a person intended to receive the message, comprising:

input means for inputting information expressed by a complex concept comprising an internal conceptual expression of a computer not in a natural language that is to be communicated to a person intended to receive a message embodying the concept;

a knowledge base having knowledge of natural languages, general knowledge, and knowledge of specific domains;

splitting means for splitting the complex concept input from said input means into individual concepts while avoiding the repetition of common data by referring to the knowledge base;

selecting means for selecting one natural language expression of a message embodying the individual concepts split by said split means from one or more natural language expressions with respect to individual concepts split by said splitting means by referring to the knowledge base, said selecting means determining the expression form of a message preferred by the person intended to receive the message by using data in said knowledge base and the individual concepts split by said splitting means, wherein said selecting means selects the natural language expression form of the message from a plurality of possible expression forms embodying the individual concepts split by said splitting means in accordance with the determined, preferred expression form of the message; and conversion means for converting the individual concepts split by said splitting means into the message embodying the individual concepts in a natural language expression selected by said selecting means.

10. A natural language processing system for processing internal conceptual expressions of a computer not in a natural language so that they are converted to a message in a natural language in accordance with the expression form of the message determined to be preferred by a person intended to receive the message, comprising:

input means for inputting information expressed by a list of concepts each comprising an internal conceptual expression of a computer not in a natural language that is to be communicated to a person intended to receive a message embodying the concept;

a knowledge base having the knowledge of natural languages, general knowledge, and the knowledge of specific domains;

linguistic concept generation means for generating a linguistic concept dependent upon language to be added to individual concepts in the list of concepts input from said input means;

parameter determination means for determining a parameter for the linguistic concept generated by said linguistic concept generation means;

selecting means for determining the expression form of a message embodying the individual concepts preferred by the person intended to receive the message by using data in said knowledge base, the individual concepts and the determined parameter and selecting one natural language expression form of the message from a plurality of possible expression forms embodying the individual concepts in accordance with the determined, preferred expression form of the message; and conversion means for converting the individual concepts into the message embodying the individual concepts in a natural language expression selected by said selecting means.

11. A system according to claim 10, wherein said parameter determination means includes gender determination means for determining the gender of a noun in a selected natural language expression selected by said selecting means.

12. A system according to claim 10, wherein said parameter determination means includes person determination means for determining the person mentioned in a selected natural language expression selected by said selecting means.

13. A system according to claim 10, wherein said selecting means selects a pronoun corresponding to duplicate nouns included in a selected natural language expression selected by said selecting means.

14. A system according to claim 10, wherein said selecting means selects an expression such that, when actors of a plurality of actions are mentioned more than once in a selected natural language expression selected by said selecting means, the description of one of the actors is omitted in the selected natural language expression selected by said selecting means.

15. A system according to claim 10, wherein said selecting means selects an interrogative sentence using an interrogative as an interrogative sentence.

16. A system according to claim 10, wherein said selecting means includes verb expression determination means for determining the form of expressing a verb.

17. A system according to claim 10, wherein said parameter determination means includes number determination means for determining the number of noun in a selected natural language expression selected by said selecting means.

18. A system according to claim 17, wherein said number determination means determines the number of noun by counting in the selected natural language expression selected by said selecting means.

19. A natural language processing method for processing internal conceptual expressions of a computer not in a natural language so that they are converted to a message in a natural language from an author to a reader in accordance with the relationship between the author and the reader, comprising:

an input step of inputting information expressed by a concept comprising an internal conceptual expression of a computer not in a natural language that is to be communicated from the author to the reader as a message embodying the concept;

a selecting step of selecting and storing the expression form in a natural language of a message embodying the concept input from said inputting step by referring to a knowledge base having the knowledge of natural languages, general knowledge, and the knowledge of specific domains, said selecting step determining the relationship between the author and the reader and determining the expression form of the message to reflect the relationship between the author and the reader preferred by the reader by using data in the knowledge base, wherein said selecting step selects the expression form of the message from a plurality of possible expression forms embodying the concept in accordance with the determined relationship between the author and the reader; and modulating the concept input by said input step on the basis of the expression form selected in said selecting step; and a conversion step of converting the concept modulated by said modulating step into the message embodying the concept in the expression form in the natural language selected in said selecting step.

20. A method according to claim 19, wherein the knowledge of the rank relation between a speaker and a listener is prestored is the knowledge base, and, in said selecting step, the expression form in the natural language is selected on the basis of the rank relation between the speaker and the listener.

21. A method according to claim 19, wherein in said selecting step, the tense of a verb is selected.

22. A method according to claim 19, wherein in said selecting step, the mood of a verb is selected.

23. A natural language processing method for processing internal conceptual expressions of a computer not in a natural language so that they are converted to a message in a natural language in accordance with the expression form of the message determined to be preferred by a person intended to receive the message, comprising:

an input step of inputting information expressed by a concept comprising an internal conceptual expression of a computer not in a natural language that is to be communicated to a person intended to receive a message embodying the concept;

a determining step of determining information to be added to the concept input in said input step by referring to a knowledge base in consideration of precedent concepts, the knowledge base having the knowledge of natural languages, general knowledge, and the knowledge of specific domains and of selecting a message embodying the concept with the added information, said determining step determining the expression form of the message preferred by the person intended to receive the message by using data in the knowledge base and the information to be added to the concept, wherein said determining step selects the expression form of the message from a plurality of possible expression forms embodying the concept to which the determined information is to be added in accordance with the determined, preferred expression form of the message; and a modulation step of modulating the concept input in said input step by adding the information determined in said determining step to the concept; and converting the concept modulated in said modulation step into the message embodying the modulated concept in a natural language.

24. A method according to claim 23, wherein in said determining step, a specific word and/or phrase corresponding to the input concept is determined to be information to be added.

25. A method according to claim 23, wherein in said determining step, a specific concept to be mentioned in duplication from among the input concepts is determined to be information to be added.

26. A natural language processing method for processing internal conceptual expressions of a computer not in a natural language so that they are converted to a message in a natural language in accordance with the expression form of the message determined to be preferred by a person intended to receive the message, comprising:

an input step of inputting information expressed by a concept comprising an internal conceptual expression of a computer not in a natural language that is to be communicated to a person intended to receive a message embodying the concept;

a connecting step of connecting a plurality of concepts input in said input step by adding a connection word or phrase and outputting the connected concepts as one concept in a message embodying the one concept by referring to a knowledge base having the knowledge of natural languages, general knowledge, and the knowledge of specific domains, said connecting step determining the expression form of the message preferred by the person intended to receive the message by using data in the knowledge base and the connected concepts, wherein said connecting step selects the expression form of the message embodying the one concept from a plurality of possible expression forms embodying the one concept in accordance with the determined, preferred expression form of the message; and a conversion step of converting the one concept output in said connecting step into the message embodying the concept in a natural language.

27. A natural language processing method for processing internal conceptual expressions of a computer not in a natural language so that they are converted to a message in a natural language in accordance with the expression form of the message determined to be preferred by a person intended to receive the message, comprising:

an input step of inputting information expressed by a complex concept comprising an internal conceptual expression of a computer not in a natural language that is to be communicated to a person intended to receive a message embodying the concept;

a splitting step of splitting the complex concept input in said input step into individual concepts while avoiding the repetition of common data by referring to a knowledge base having the knowledge of natural languages, general knowledge, and the knowledge of specific domains;

a selecting step of selecting one natural language expression of a message embodying the individual concepts split in said splitting step from one or more natural language expressions with respect to individual concepts split in said splitting step, said selecting step determining the expression form of a message preferred by the person intended to receive the message by using data in the knowledge base and the individual concepts split by said splitting step, wherein said selecting step selects the natural language expression form of the message from a plurality of possible expression forms embodying the individual concepts split by said splitting step in accordance with the determined, preferred expression form of the message; and a conversion step of converting the individual concepts split by said splitting means into a message embodying the individual concepts in the natural language expression selected in said selecting step.

28. A natural language processing method for processing internal conceptual expressions of a computer not in a natural language so that they are converted to a message in a natural language in accordance with the expression form of the message determined to be preferred by a person intended to receive the message, comprising:

an input step of inputting information expressed by a list of concepts each comprising an internal conceptual expression of a computer not in a natural language that is to be communicated to a person intended to receive a message embodying the concept;

a linguistic concept generating step for generating a linguistic concept dependent upon language to be added to individual concepts in the list of concepts input in said input step;

a parameter determining step of determining a parameter for the linguistic concept generating in said linguistic concept generating step;

a selecting step of determining the expression form of a message embodying the individual concepts preferred by the person intended to receive the message by using the individual concepts, the determined parameter, and data in a knowledge base having the knowledge of natural languages, general knowledge, and the knowledge of specific domains, said selecting step selecting one natural language expression form of the message from a plurality of possible expression forms embodying the individual concepts in accordance with the determined, preferred expression form of the message; and a conversion step of converting the individual concepts into the message embodying the individual concepts in a natural language expression selected in said selecting step.

29. A method according to claim 28, wherein said parameter determining step includes a step of determining the gender of a noun in a selected natural language expression selected by said selecting step.

30. A method according to claim 28, wherein said parameter determining step includes a person determining step for determining the person mentioned in the selected natural language expression selected in said selecting step.

31. A method according to claim 28, wherein said selecting step selects a pronoun corresponding to duplicate nouns mentioned in the selected natural language expression selected in said selecting step.

32. A method according to claim 28, wherein said selecting step selects an expression such that, when actors of a plurality of actions are mentioned more than once in a selected natural language expression selected by said selecting means, the description of one of the actors is omitted in the selected natural language expression selected by said selecting step.

33. A method according to claim 28, wherein said selecting step selects an interrogative sentence using an interrogative as an interrogative sentence.

34. A method according to claim 28, wherein said selecting step includes a verb expression determining step of determining the form of expressing a verb.

35. A method according to claim 28, wherein said parameter determining step includes a number determining step of determining the number of nouns in a selected natural language expression selected by said selecting step.

36. A method according to claim 35, wherein in said number determining step the number of noun is determined by counting in the selected natural language expression selected by said selecting step.

37. A natural language processing system for outputting a message in a natural language from an author to a reader in accordance with the relationship between the author and the reader, the expression form of the message reflecting the rank relation between the author and the reader, comprising:

input generating means for inputting information expressed by a concept that is to be communicated to a person as a message embodying the concept;

a knowledge base having the knowledge of languages, general knowledge, the knowledge of specific domains, and the knowledge of the rank relation between the person intended to receive the message and the author of the message;

selecting means for determining the relationship between the author and the reader and for selecting the expression form of a message embodying the concept which is input from said input means by referring to the knowledge base, wherein said selecting means determines the expression form of the message to reflect the relationship between the author and the reader by using data of the rank relation between the person intended to receive the message and the author of the message stored in said knowledge base, wherein said selecting means selects the expression form of the message embodying the concept in a natural language from a plurality of possible expression forms embodying the concept in accordance with the determined relationship between the author and the reader reflecting the rank relation between the person intended to receive the message and the author of the message; and output means for outputting the message having the expression form selected by said selecting means.

38. A natural language processing system for outputting a message in a natural language from an author to a reader in accordance with the relationship between the author and the reader, comprising:

input means for inputting information expressed by a concept that is to be communicated from an author to a reader to a person intended to receive as a message embodying the concept;

a knowledge base having the knowledge of languages, general knowledge, and the knowledge of specific domains including knowledge of the mood of verbs;

selecting means for selecting the expression form in a natural language of a message embodying the concept which is input from said input means by referring to the knowledge base, wherein said selecting means determines the relationship between the author and the reader and determines the expression form of the message to reflect the relationship between the author and the reader and determines the mood of the verb in the message preferred by the reader by using data stored in said knowledge base, wherein said selecting means selects the mood of the verb to be used in the message embodying the concept in a natural language from a plurality of possible expression forms embodying the concept in accordance with the determined, preferred mood of the verb; and output means for outputting a message having the expression form selected by said selecting means.

39. A natural language processing system for outputting a message in a natural language from an author to a reader in accordance with the relationship between the author and the reader, comprising:

input means for inputting information expressed by a concept that is to be communicated from the author to the reader as a message embodying the concept;

a knowledge base having the knowledge of languages, general knowledge, and the knowledge of specific domains;

determination means for determining relationship between the author and the reader and determining the expression form of the message to reflect the relationship between the author and the reader by using data in said knowledge base and by determining information to be added to input information from said input means by referring to the knowledge base, wherein said determination means determines a specific concept to be mentioned in duplication from among input concepts to be information to be added, wherein said determination means selects the expression form of the message from a plurality of possible expression forms embodying the specific concept to be mentioned in duplication in accordance with the determined relationship between the author and the reader; and output means for adding the information determined by said determination means to said input information and outputting a message embodying the information.

40. A natural language processing method for outputting a message in a natural language from an author to a reader in accordance with the relationship between the author and the reader, the expression form of the message reflecting the rank relation between the person intended to receive the message and the author of the message, comprising:

an input step of inputting information expressed by a concept that is to be communicated from the author to the reader as a message embodying the concept;

a selecting step of selecting and storing the expression form in a natural language of a message embodying the concept input from said inputting step by referring to a knowledge base having the knowledge of languages, general knowledge, the knowledge of specific domains, and the knowledge of the rank relation between the person intended to receive the message and the author of the message, wherein said selecting step determines the relationship between the author and the reader and determines the expression form of the message to reflect the relationship between the author and the reader by using data of the rank relation between the person intended to receive the message and the author of the message stored in the knowledge base, wherein said selecting step selects the expression form of the message embodying the concept in a natural language from a plurality of possible expression forms embodying the concept in accordance with the determined relationship between the author and the reader reflecting the rank relation between the person intended to receive the message and the author of the message; and an output step of outputting the message having the expression form selected in said selecting step.

41. A natural language processing method for outputting a message in a natural language from an author to a reader in accordance with the relationship between the author and the reader, comprising:

an input step of inputting information expressed by a concept that is to be communicated from the author to the reader as a message embodying the concept;

a selecting step of selecting and storing the expression form in a natural language of a message embodying the concept input from said inputting step by referring to a knowledge base having the knowledge of languages, general knowledge, and the knowledge of specific domains including knowledge of the mood of verbs, wherein said selecting step determines the relationship between the author and the reader and determines the expression form of the message to reflect the relationship between the author and the reader and determines by referring to the knowledge base, wherein said selecting step selects the mood of the verb to be used in the message embodying the concept in a natural language from a plurality of possible expression forms embodying the concept in accordance with the determined, preferred mood of the verb; and an output step of outputting the message having the expression form selected in said selecting step.

42. A natural language processing method for outputting a message in a natural language from an author to a reader in accordance with the relationship between the author and the reader, comprising:

an input step of inputting information expressed by a concept that is to be communicated from the author to the reader as a message embodying the concept;

a determining step of determining the relationship between the author and the reader and determining the expression form of the message to reflect the relationship between the author and the reader by using data in a knowledge base and by determining information to be added to the input information from said input step by referring to the knowledge base, the knowledge base having the knowledge of languages, general knowledge, and the knowledge of specific domains, wherein in said determining step a specific concept to be mentioned in duplication from among the input concepts is determined to be information to be added, wherein said determination step selects the expression form of the message from a plurality of possible expression forms embodying the specific concept to be mentioned in duplication in accordance with the determined, relationship between the author and the reader, embodying the information.

43. A computer usable medium having computer readable program code means embodied therein for causing a computer to process internal conceptual expressions thereof not in a natural language so that they are converted to a message in a natural language from an author to a reader in accordance with the relationship between the author and the reader, said computer readable program code means comprising:

first computer readable program code means for causing the computer to input information expressed by a concept comprising an internal conceptual expression of a computer not in a natural language that is to be communicated from the author to the reader as a message embodying the concept;

second computer readable program code means for causing the computer to select and store the expression form in a natural language of a message embodying the concept caused to be input by said first computer readable program code means by referring to a knowledge base having the knowledge of natural languages, general knowledge, and the knowledge of specific domains, said second computer readable program code means causing the computer to determine the relationship between the author and the reader and to determine the expression form of the message to reflect the relationship between the author and the reader by using data in the knowledge base, wherein said second computer readable program code means causes the computer to select the expression form of the message from a plurality of possible expression forms embodying the concept in accordance with the determined relationship between the author and the reader;

third computer readable program code means for causing the computer to modulate the concept caused to be inputted by said first computer readable program code means on the basis of the expression form caused to be selected by said second computer readable program code means; and fourth computer readable program code means for causing the computer to convert the concept caused to be modulated by said third computer readable program code means into a message embodying the concept in the expression form in the natural language caused to be selected by said second computer readable program code means.

44. A computer usable medium having computer readable program code means embodied therein for causing a computer to process internal conceptual expressions thereof not in a natural language so that they are converted to a message in a natural language in accordance with the expression form of the message determined to be preferred by a person intended to receive the message, said computer readable program code means comprising:

first computer readable program code means for causing the computer to input information expressed by a concept comprising an internal conceptual expression of a computer not in a natural language that is to be communicated to a person intended to receive a message embodying the concept;

second computer readable program code means for causing the computer to determine information to be added to a concept caused to be inputted by said first computer readable program code means by referring to a knowledge base in consideration of precedent concepts, the knowledge base having the knowledge of natural languages, general knowledge, and the knowledge of specific domains, for causing the computer to select a message embodying the concept with the added information, for causing the computer to determine the expression form of the message preferred by the person intended to receive the message by using data in said knowledge base and by determining the information to be added to the input concept, and for causing the computer to select the expression form of the message from a plurality of possible expression forms embodying the concept and the information to be added to the concept in accordance with the determined, preferred expression form of the message;

third computer readable program code means for causing the computer to modulate the concept caused to be inputted by said first computer readable program code means by adding the information caused to be determined by said second computer readable program code means to the concept; and fourth computer readable program code means for causing the computer to convert the concept caused to be modulated by said third computer readable program code means into a message embodying the modulated concept in a natural language.

45. A computer usable medium having computer readable program code means embodied therein for causing a computer to process internal conceptual expressions thereof not in a natural language so that they are converted to a message in a natural language in accordance with the expression form of the message determined to be preferred by a person intended to receive the message, said computer readable program code means comprising:

first computer readable program code means for causing the computer to input information expressed by a concept comprising an internal conceptual expression of a computer not in a natural language that is to be communicated to a person intended to receive a message embodying the concept;

second computer readable program code means for causing the computer to connect a plurality of concepts caused to be inputted by said first computer readable program code means and to output the connected concepts as one concept in a message embodying the one concept by referring to a knowledge base having the knowledge of natural languages, general knowledge, and the knowledge of specific domains, said second computer readable program code means causing the computer to determine the expression form of the message preferred by the person intended to receive the message by using data in the knowledge base and by connecting the plurality of concepts by adding a connection word or phrase, wherein said second computer readable program code means causes the computer to select the expression form of the message embodying the one concept from a plurality of possible expression forms embodying the one concept in accordance with the determined, preferred expression form of the message; and third computer readable program code means for causing the computer to convert the one concept caused to be outputted by said second computer readable program code means into a message embodying the concepts in a natural language.

46. A computer usable medium having computer readable program code means embodied therein for causing a computer to process internal conceptual expressions thereof not in a natural language so that they are converted to a message in a natural language in accordance with the expression form of the message determined to be preferred by a person intended to receive the message, said computer readable program code means comprising:

first computer readable program code means for causing the computer to input information expressed by a complex concept comprising an internal conceptual expression of a computer not in a natural language that is to be communicated to a person intended to receive a message embodying the concept;

second computer readable program code means for causing the computer to split the complex concept caused to be inputted by said first computer readable program code means into individual concepts while avoiding the repetition of common data, by referring to a knowledge base having the knowledge of natural languages, general knowledge, and the knowledge of specific domains;

third computer readable program code means for causing the computer to select one natural language expression form of a message embodying the individual concepts split by said splitting means from one or more natural language expressions with respect to the individual concepts caused to be split by said second computer readable program code means, said third computer readable program code means causing the computer to determine the expression form of a message preferred by the person intended to receive the message by using data in said knowledge base and the individual concepts caused to be split by said second computer readable program code means, wherein said third computer readable program code means causes the computer to select the natural language expression form of the message from a plurality of possible expression forms embodying the individual concepts caused to be split by said second computer readable program code means in accordance with the determined, preferred expression form of the message; and fourth computer readable program code means for causing the computer to convert the individual concepts caused to be split by said second computer readable program code means into a message embodying the individual concepts in a natural language expression caused to be selected by said third computer readable program code means.

* * * * *

UNITED STATES PATENT AND TRADEMARK OFFICE
CERTIFICATE OF CORRECTION

PATENT NO. : 6,023,669

DATED : February 8, 2000

INVENTOR(S) : Aruna Rohra SUDA, et al.

Page 1 of 6

It is certified that error appears in the above-identified patent and that said Letters Patent is hereby corrected as shown below:

IN THE DRAWINGS:

Sheet 3, Figure 3, "includindg" should read --including--.
Sheet 6, Figure 6, "includindg" should read --including--.
Sheet 7, Figure 7, "includindg" should read --including--.
Sheet 10, Figure 10A, "analyse" (all occurrences) should read --analyze--.
Sheet 11, Figure 10B, "bencils" should read --pencils--.
Sheet 13, Figure 12, "*Suppor, *Timet" should read --*Support, *Time--.
Sheet 14, Figure 13, "CONNECTE" should read --CONNECT--.
Sheet 16, Figure 15, add a downwardly pointing arrow from step S511 to step END.
Sheet 17, Figure 16, "Litsener" should read --Listener--; "them" (both occurrences) should read --then--.
Sheet 22, Figure 21, "CannedPhrase" should read --Canned Phrase-- and "Connectedto" should read --Connected to--.
Sheet 24, Figure 23, "lnn..)}" should read --lnn..))}--.
Sheet 25, Figure 24, "lnn..)}" should read --lnn..))}--.
Sheet 28, Figure 27, "through out" should read --throughout-- and "b) "There is" should read --b) "There is a--.
Sheet 31, Figure 30, "(FTURE)" should read --(FUTURE)--.
Sheet 36, Figure 35, insert --S3504-- and a lead line therefrom to the box labeled "ADD 'WORD' TO SENTENCE".
Sheet 38, Figure 37, "PRASE" should read --PHRASE--.
Sheet 42, Figure 41, "WHICE" (all occurrences) should read --WHICH--.
Sheet 43, Figure 42, 'DETERMING" should read --DETERMINING--.
Sheet 47, Figure 46, "Supress" should read --Suppress--.

UNITED STATES PATENT AND TRADEMARK OFFICE
CERTIFICATE OF CORRECTION

PATENT NO. : 6,023,669
DATED : February 8, 2000
INVENTOR(S) : Aruna Rohra SUDA, et al.

It is certified that error appears in the above-identified patent and that said Letters Patent is hereby corrected as shown below:

IN THE DRAWINGS:
  Sheet 48, Figure 47, "Frome" should read --From-- and "Orge 2" should read --Org2--.
  Sheet 49, Figure 48, "Supress" should read --Suppress--.
  Sheet 50, Figure 49, "Connectedto" should read --Connected to--.
  Sheet 52, Figure 51, "CannedPhrase" should read --Canned Phrase-- and "Connectedto" should read --Connected to--.
  Sheet 53, Figure 52, "CannedPhrase" should read --Canned Phrase--.
  Insert Sheet 54 showing the following Figure 53:

FIG 53

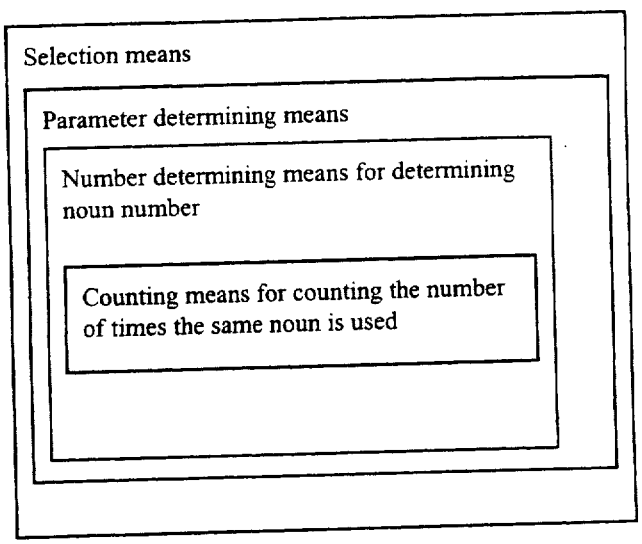

UNITED STATES PATENT AND TRADEMARK OFFICE
CERTIFICATE OF CORRECTION

PATENT NO. : 6,023,669

DATED : February 8, 2000

INVENTOR(S): Aruna Rohra SUDA, et al.

It is certified that error appears in the above-identified patent and that said Letters Patent is hereby corrected as shown below:

COLUMN 3:
 Line 27, "dictionary." should read --dictionary;--.

COLUMN 4:
 Line 17, "with" should read --with respect to English--.
 Line 35, "and" should be deleted.
 Line 36, "structure." should read --structure; and--
 Line 47, "accordance" should read --accordance to--.

COLUMN 5:
 Line 32, "to" should read --to the fact--.
 Line 40, "an" should read --a--.

COLUMN 6:
 Line 10, "concepts" should read --concept--.

COLUMN 7:
 Line 8, "is" should read --are--.
 Line 30, "FIG. 11," should read --FIG. 16,--.

COLUMN 9:
 Line 28, "is" should read --are--.
 Line 33, "is" should read --are--

UNITED STATES PATENT AND TRADEMARK OFFICE
CERTIFICATE OF CORRECTION

PATENT NO. : 6,023,669

DATED : February 8, 2000

INVENTOR(S) : Aruna Rohra SUDA, et al.

It is certified that error appears in the above-identified patent and that said Letters Patent is hereby corrected as shown below:

COLUMN 10:
Line 19, "S8 11" (both occurrences) should read --S811--.

COLUMN 11:
Line 56, "form" (first occurrence) should read --forms--.

COLUMN 12:
Line 49, "FIG. 12," should read --from FIG. 12,--.

COLUMN 15:
Line 35, "10th" should be deleted.
Line 36, "May" should read --May 10th--.

UNITED STATES PATENT AND TRADEMARK OFFICE
CERTIFICATE OF CORRECTION

PATENT NO.    :    6,023,669

DATED         :    February 8, 2000

INVENTOR(S)   :    Aruna Rohra SUDA, et al.

It is certified that error appears in the above-identified patent and that said Letters Patent is hereby corrected as shown below:

COLUMN 19:
  Line 24, "noun" should read --nouns--.
  Line 28, "noun" should read --nouns--.

COLUMN 20:
  Line 35, "and" should be deleted.

COLUMN 21:
  Line 63, "generating" should read --generated--.

COLUMN 22:
  Line 44, "noun" should read --nouns--.

UNITED STATES PATENT AND TRADEMARK OFFICE
CERTIFICATE OF CORRECTION

PATENT NO. : 6,023,669
DATED : February 8, 2000
INVENTOR(S) : Aruna Rohra SUDA, et al.

It is certified that error appears in the above-identified patent and that said Letters Patent is hereby corrected as shown below:

COLUMN 24:
Line 49, "determines" should read --determines the mood of the verb in the message--.
Line 65, "concept;" should read --concept; and--.

COLUMN 25:
Line 15, "determined," should read --determined--.

Signed and Sealed this

Fifteenth Day of May, 2001

NICHOLAS P. GODICI

*Attest:*

*Attesting Officer*     *Acting Director of the United States Patent and Trademark Office*